US 6,679,504 B2

(12) United States Patent
Delorenzis et al.

(10) Patent No.: US 6,679,504 B2
(45) Date of Patent: *Jan. 20, 2004

(54) SEAMLESS CONTROL OF SPRING STIFFNESS IN A LIQUID SPRING SYSTEM

(75) Inventors: Damon Delorenzis, Long Beach, CA (US); Richard J. Meyer, Sante Fe Springs, CA (US)

(73) Assignee: Liquidspring Technologies, Inc., Santa Fe Springs, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/001,128

(22) Filed: Oct. 23, 2001

(65) Prior Publication Data

US 2003/0075881 A1 Apr. 24, 2003

(51) Int. Cl.⁷ .................... B60G 17/015; B60G 17/04
(52) U.S. Cl. ................ 280/5.507; 280/5.512; 280/5.519; 701/38
(58) Field of Search ............... 280/5.507, 5.512, 280/5.51, 5.508, 5.513, 5.515, 5.519, 124.157, 124.159, 124.161; 701/38, 37

(56) References Cited

U.S. PATENT DOCUMENTS

| | | |
|---|---|---|
| 2,072,701 A | 3/1937 | Barlow |
| 2,225,986 A | 12/1940 | Glezen |
| 3,146,862 A | 9/1964 | Van Winsen |
| 3,483,952 A | 12/1969 | Cardwell |
| 3,618,928 A | 11/1971 | Taylor |
| 3,933,344 A | 1/1976 | Taylor |
| 4,031,978 A | 6/1977 | Taylor |
| 4,079,923 A | 3/1978 | Kirchner |
| 4,099,602 A | 7/1978 | Kourbetsos |
| 4,182,529 A | 1/1980 | Taylor |
| 4,212,087 A | 7/1980 | Mortensen |
| 4,305,486 A | 12/1981 | Cowan |

(List continued on next page.)

FOREIGN PATENT DOCUMENTS

| | | |
|---|---|---|
| DE | 3608738 | 9/1987 |
| DK | 144808 | 10/1903 |
| FR | 0993524 | 4/1948 |
| GB | 2192967 | 1/1988 |
| GB | 2227981 | 8/1990 |
| JP | 57-160707 | 10/1982 |
| JP | 60-179315 | 9/1985 |
| JP | 60-226311 | 11/1985 |

OTHER PUBLICATIONS

Appleby, "Calif. hospitals on shaky ground", USA Today Money Section B, Nov. 7, 2000.
"Seismic Isolation addresses all issues associated with earthquake safety. It protects life, prevents building failure and damage, and maintains functionality." Dynamic Isolation Systems, Inc.—pp. 2–8, Oct. 23, 2001.
Architectural Analysis with Foundation Plans re Earthquake Application, URIU & Associates, pp. 2–11, Sep. 18, 1995.
Brochure on "Taylor Devices Seismic Dampers and Seismic Isolation Products", Taylor Devices, Inc., pp. 1–9, Oct. 14, 1997.

Primary Examiner—Peter C. English
(74) Attorney, Agent, or Firm—Christie, Parker & Hale, LLP

(57) ABSTRACT

A vibration control system for a structure having a first structural member and a second structural member. The vibration control system having a liquid spring operably interposed between the first structural member and the second structural member. The liquid spring uses a compressible liquid to seamlessly generate spring and/or damping forces in the suspension system in response to relative displacement between the first structural member and the second structural member. A second volume of compressible liquid is located in a second chamber. The second volume is removably connected to the liquid spring by a fluid passage. A valve is coupled to the fluid passage, the valve selectively operable to place the second volume in communication with the liquid spring. A controller is electrically coupled to the valve. The controller emitting a control signal to control the valve.

19 Claims, 25 Drawing Sheets

U.S. PATENT DOCUMENTS

| | | | |
|---|---|---|---|
| 4,402,527 A | | 9/1983 | Kakehi et al. |
| 4,513,833 A | | 4/1985 | Sheldon |
| 4,546,960 A | | 10/1985 | Abrams et al. |
| 4,561,641 A | | 12/1985 | DeYoung et al. |
| 4,638,670 A | | 1/1987 | Moser |
| 4,638,895 A | | 1/1987 | Taylor et al. |
| 4,652,008 A | | 3/1987 | Davis |
| 4,671,392 A | | 6/1987 | Wössner |
| 4,693,493 A | * | 9/1987 | Ikemoto et al. ......... 280/5.507 |
| 4,729,459 A | | 3/1988 | Inagaki et al. |
| 4,733,883 A | | 3/1988 | Sugasawa et al. |
| 4,741,516 A | | 5/1988 | Davis |
| 4,793,451 A | | 12/1988 | Taylor |
| 4,826,205 A | | 5/1989 | Kouda et al. |
| 4,916,632 A | * | 4/1990 | Doi et al. ............ 280/5.515 |
| 4,975,849 A | * | 12/1990 | Ema ................... 280/5.507 |
| 5,004,264 A | | 4/1991 | Kozaki et al. |
| 5,018,756 A | | 5/1991 | Mitchell |
| 5,062,659 A | | 11/1991 | Edahiro et al. |
| 5,097,419 A | | 3/1992 | Lizell |
| 5,102,161 A | * | 4/1992 | Williams ............... 280/5.515 |
| 5,145,205 A | * | 9/1992 | Takehara et al. ........ 280/5.512 |
| 5,152,547 A | | 10/1992 | Davis |
| 5,265,704 A | | 11/1993 | Landesfeind |
| 5,297,653 A | | 3/1994 | Wurtz et al. |
| 5,316,272 A | | 5/1994 | Davis |
| 5,347,457 A | * | 9/1994 | Tanaka et al. ............. 701/38 |
| 5,360,230 A | * | 11/1994 | Yamada et al. ......... 280/5.515 |
| 6,293,530 B1 | | 9/2001 | Delorenzis et al. |
| 6,305,673 B1 | | 10/2001 | Delorenzis et al. |

* cited by examiner

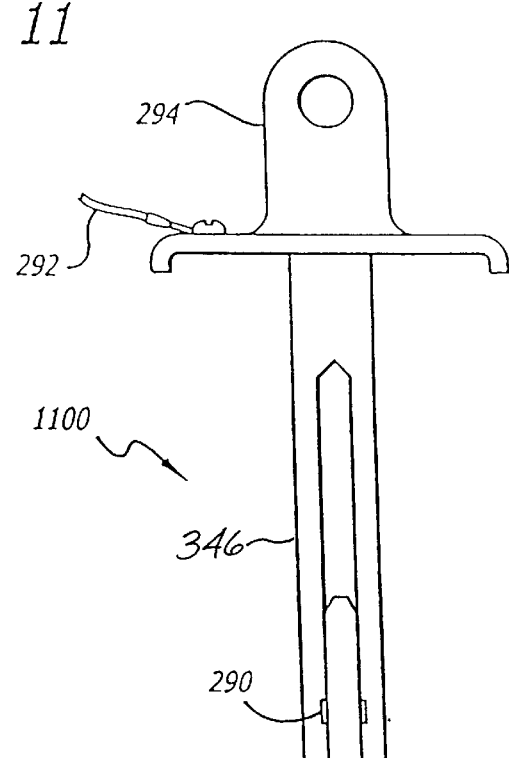
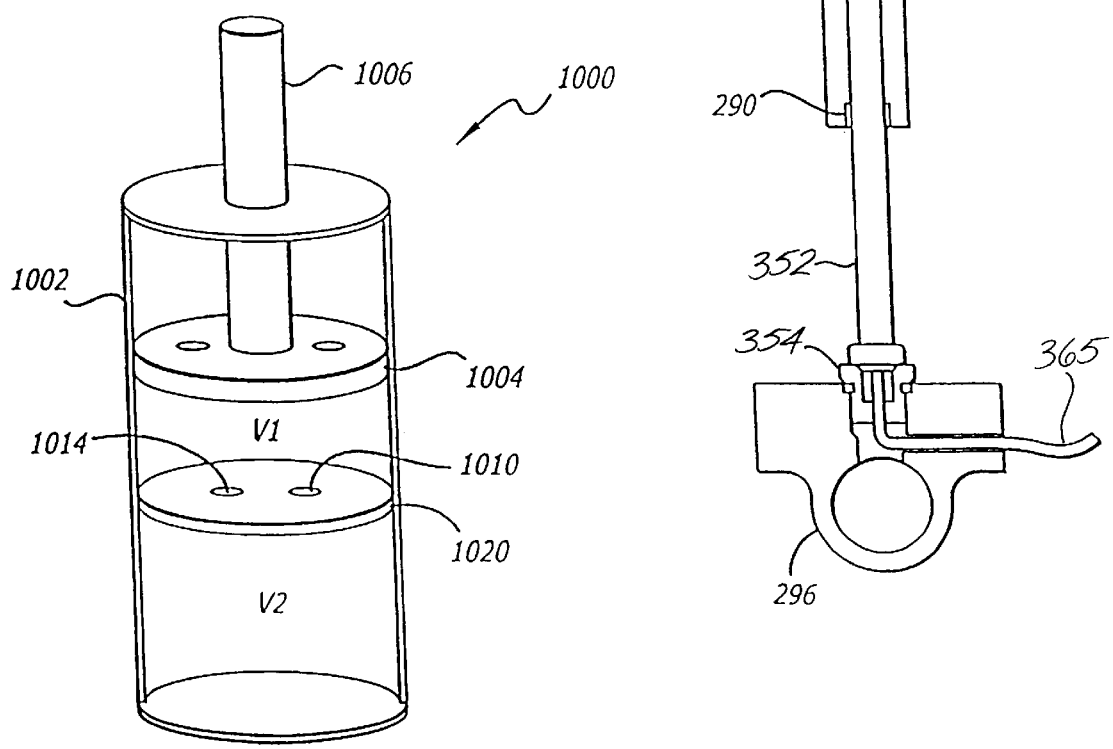

FREQUENCY RESPONSE AT TWO DIFFERENT SYSTEM RATES

TRANSFER FUNCTION GAIN AT TWO DIFFERENT SYSTEM RATES

FIG. 16
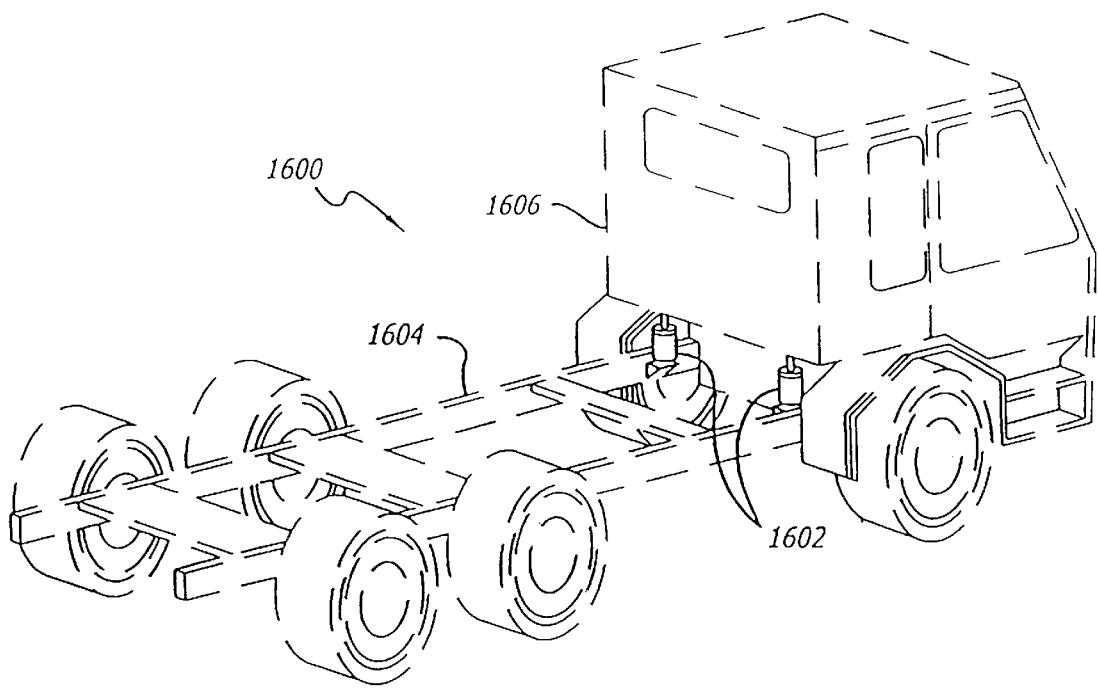
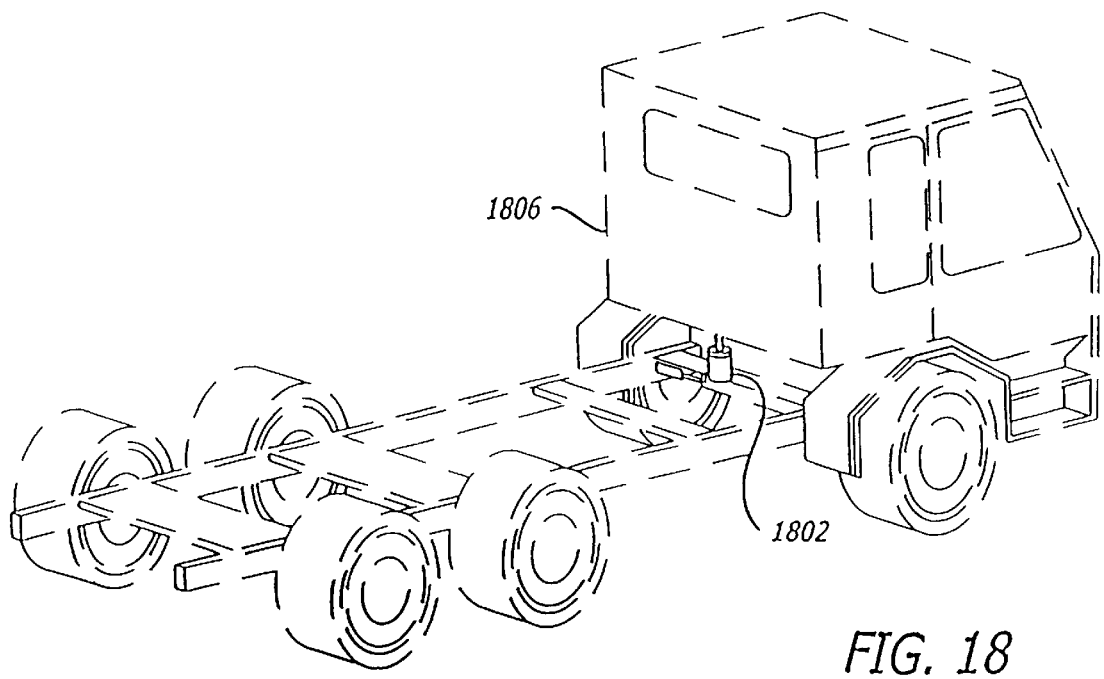
FIG. 18

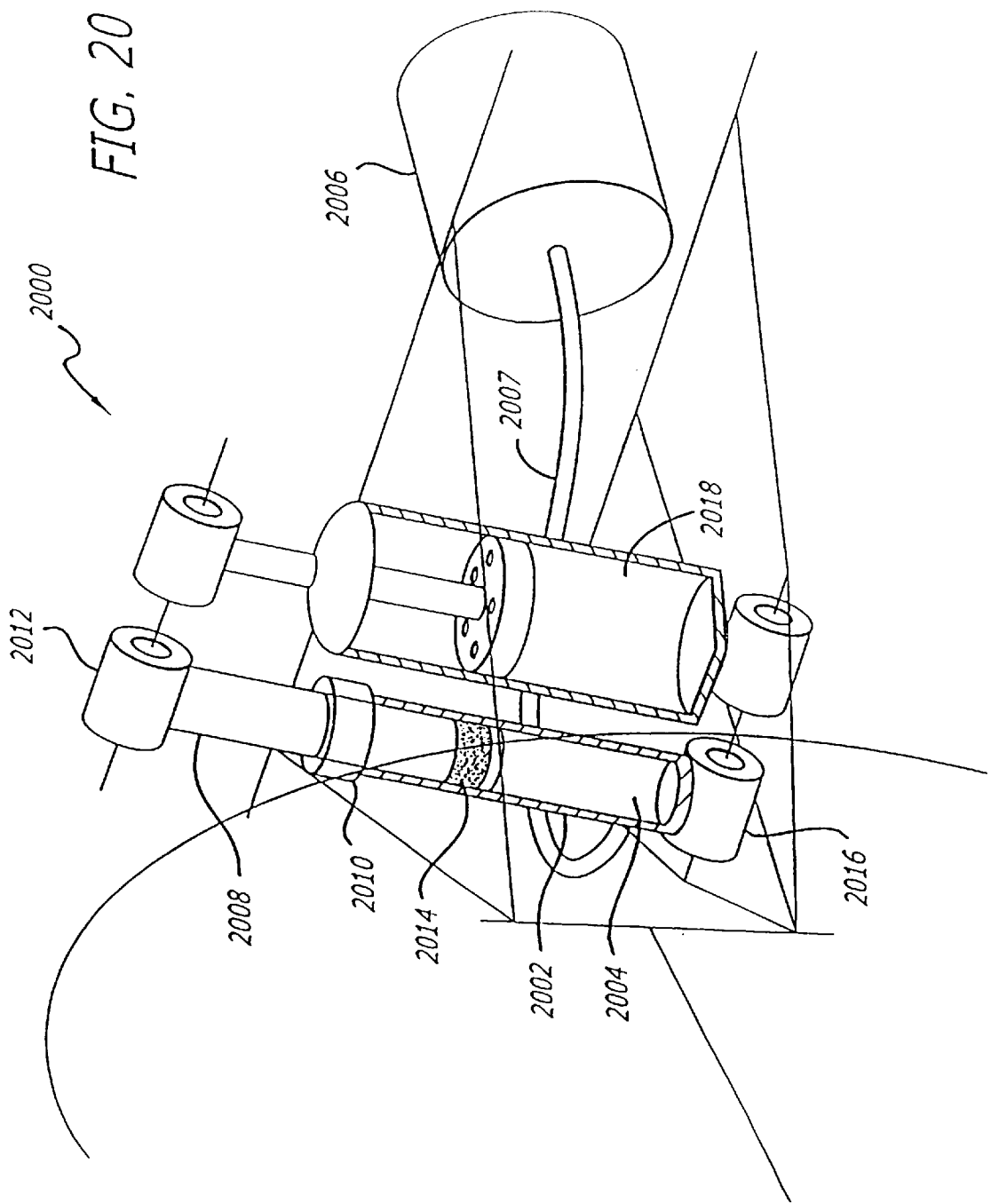

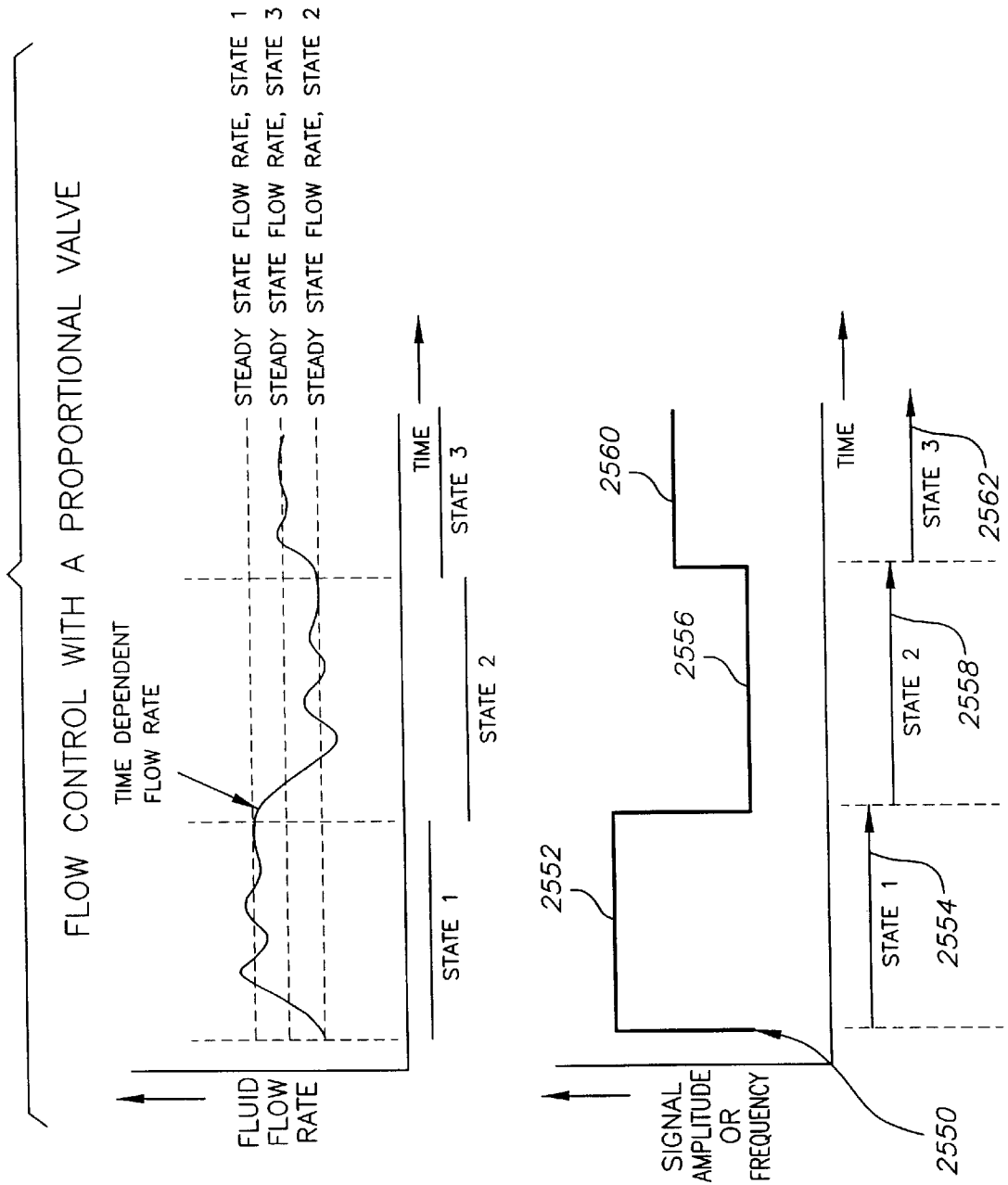

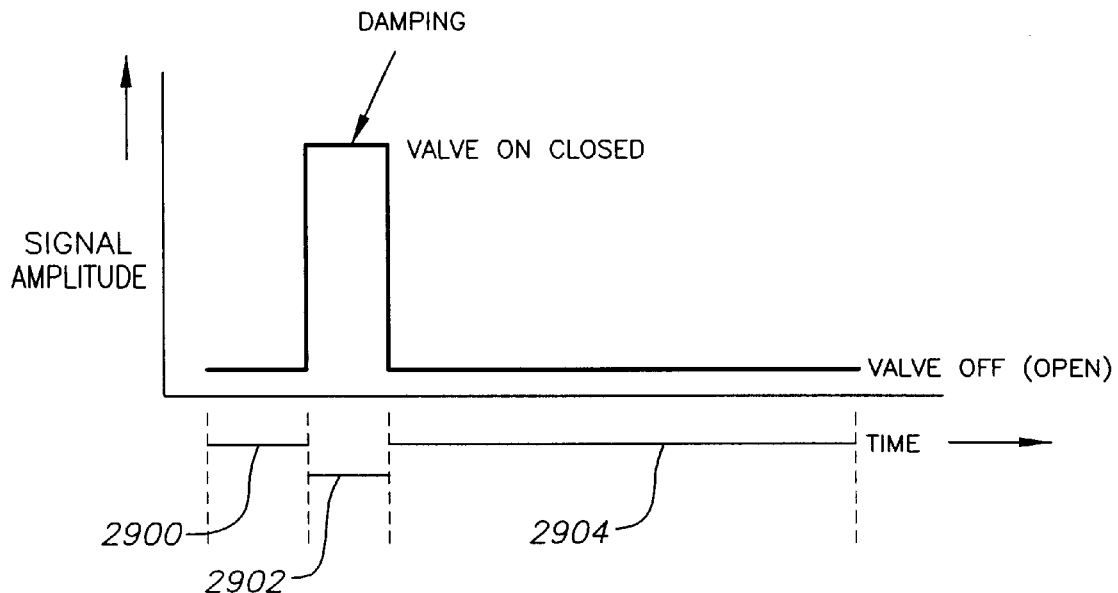
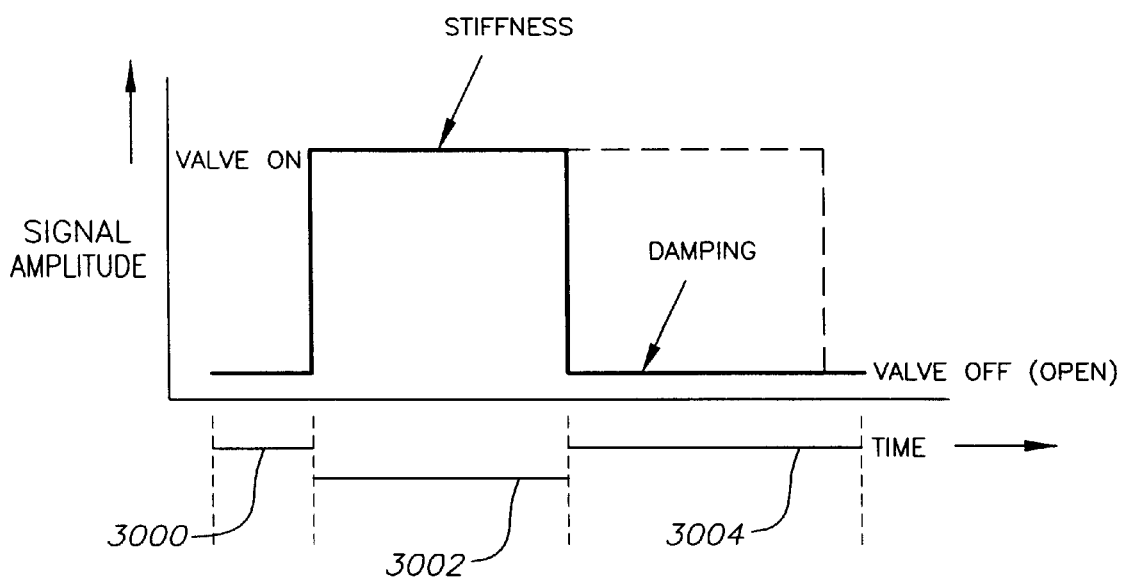

US 6,679,504 B2

SEAMLESS CONTROL OF SPRING STIFFNESS IN A LIQUID SPRING SYSTEM

FIELD OF THE INVENTION

The present invention relates to vibration control systems and, more particularly, to a system and method for seamlessly controlling the stiffness and damping of a liquid spring vibration control system using a controlled valve.

BACKGROUND OF THE INVENTION

Vibration is a destructive force in a variety of environments. Vibration can be periodic, as created by a rotating compressor in an air conditioning unit or an engine in a car. Periodic vibration is characterized by a particular frequency and amplitude. Random vibration, on the other hand, has no dominant frequency and no dominant amplitude. Instead, the vibration must be analyzed quantitatively to determine average amplitudes and common frequencies. Damping is the process by which vibration steadily diminishes in amplitude. In damping, the energy of the vibrating system is dissipated as friction or heat, or transmitted as sound. The process of damping can take any of several forms, and often more than one form is present.

Liquid springs can utilize a compressible liquid to provide damping forces. A liquid spring can comprise a cylindrical housing having an internal chamber with a compressible liquid therein, a piston reciprocally disposed in the chamber, and a rod structure axially movable into and out of the chamber, secured to the piston, and having an outer longitudinal portion projecting outwardly of one of the housing ends. If a liquid spring is used between a vehicle frame and an associated wheel support structure, the compressible liquid within the liquid spring generates both stiffness and damping forces in the suspension system in response to relative axial translation between the rod structure and housing of the liquid spring caused by relative displacement between the wheel and the frame.

Although liquid springs provide stiffness or damping forces, a need exists for a way to change the amount of stiffness or damping of the liquid spring in response to changing conditions.

SUMMARY OF THE INVENTION

The present invention in an exemplary embodiment is a vibration control system for a structure having a first structural member and a second structural member. A vibration control system according to an embodiment has a liquid spring operably interposed between the first structural member and the second structural member using a compressible liquid to generate spring forces in response to relative displacement between the first structural member and the second structural member. The present invention provides for a system and method of changing the stiffness of a vibration control system in response to changing conditions.

The present invention in one embodiment is an application for a suspension system for use on a vehicle having a frame and a wheel structure. The system has a liquid spring operably interposed between the frame and the wheel structure. The liquid spring uses a compressible liquid to generate spring forces in the suspension system in response to relative displacement between the frame and the wheel structure. A second volume of compressible liquid is stored in a second chamber. The second volume is removably connected to the liquid spring by a fluid passage. A valve is coupled to the fluid passage. The valve is selectively operable to place the second volume in communication with the liquid spring. A controller is electrically coupled to the valve, the controller emitting a control signal having a period and a pulse width to control the valve. The controller alters the pulse width of the control signal to open and close the valve for a portion of the period.

In an embodiment of the present invention, a height sensor is electrically coupled to the controller. The height sensor produces a signal indicative of the position of the frame in relation to the wheel. A speed sensor is electrically coupled to the controller. The speed sensor produces a signal indicative of the speed of the vehicle. A steering position sensor is electrically coupled to the controller. The steering position sensor produces a signal indicative of a steering wheel position for the vehicle. The controller alters the pulse width of the control signal in response to at least one of the group consisting of the height sensor signal, the speed sensor signal, and the steering wheel position signal.

In an additional embodiment, an accelerometer is electrically coupled to the controller. The accelerometer produces a signal indicative of an acceleration experienced by the vehicle. The controller may also alter the pulse width of the control signal in response to the accelerometer signal. In yet another embodiment, a brake sensor is electrically coupled to the controller. The brake sensor produces a signal indicative of a brake application of the vehicle. The controller may also alter the pulse width of the control signal in response to the brake sensor signal.

In an additional embodiment, a mode selection switch is electrically coupled to the controller. The mode selection switch producing a signal indicative of desired suspension performance. In an embodiment, the selection switch allows for the selection of three settings of varying ride and handling character. The controller may further alter the pulse width in response to the mode selection switch signal.

In an embodiment of the present invention, the suspension system is for a vehicle with a plurality of wheels. Each of the wheels has at least one liquid spring. Each wheel also has an associated height sensor. The controller alters the pulse width for each wheel in response to the particular wheel's height sensor signal, the speed sensor signal, the steering wheel position signal, and the mode selection switch signal. In an exemplary embodiment, the vehicle has four wheels, four liquid springs, and four height sensors.

In an embodiment, the control signal has a period of about one second and the pulse width may be modulated to activate the valve for any portion of the period.

BRIEF DESCRIPTION OF THE DRAWINGS

For a more complete understanding of the present invention, and for further details and advantages thereof, reference is now made to the following Detailed Description taken in conjunction with the accompanying drawings, in which:

FIG. 10 provides an alternative arrangement of the embodiment shown in FIG. 6;

FIG. 11 is a partial sectional view of a position transducer;

FIGS. 16 and 17 illustrate an active vibration control system applied between a vehicle cabin and a vehicle frame;

FIGS. 18 and 19 illustrate a passive vibration control system applied between a vehicle cabin and a vehicle frame;

FIGS. 20 and 21 illustrative a pistonless liquid spring for use in vibration control;

FIG. 25a is a graph showing the effect of proportional valve position changes on fluid flow rate;

FIG. 29 is a graph showing signal changes when a stiffness command of zero and a damping command are combined according to an embodiment of the present invention;

FIG. 30 is a graph showing signal changes when a stiffness command not equal to zero and a damping command are combined according to an embodiment of the present invention.

DETAILED DESCRIPTION

Figure 1:
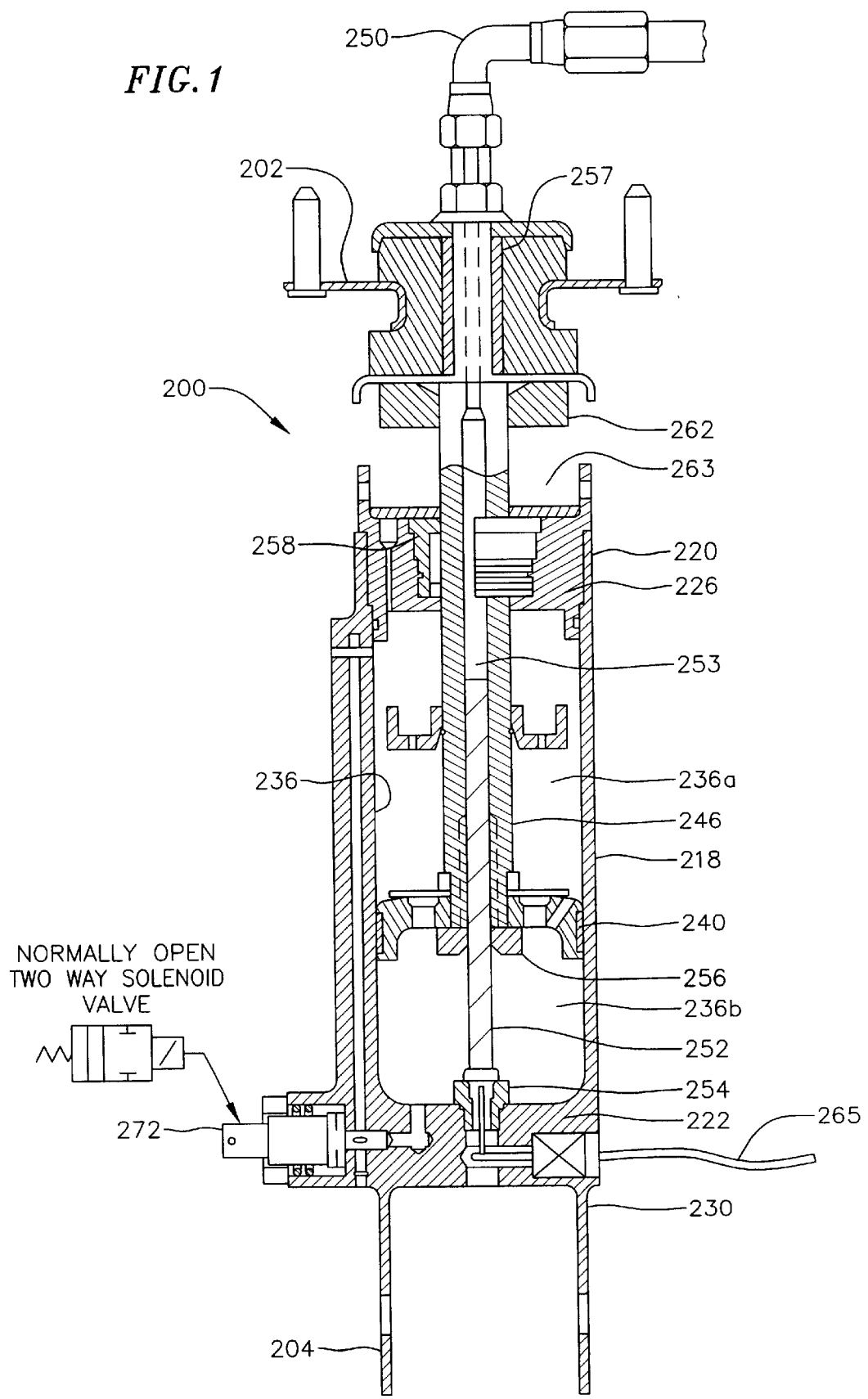
FIG. 1 is a schematic, partially cross-sectional illustration of an adjustable liquid spring device which embodies principles of the present invention.

Schematically illustrated in FIG. 1 is a partially cross-sectional illustration of an adjustable liquid spring device, indicated generally at 200, which embodies principles of the present invention. Liquid spring 200 comprises a generally vertically oriented, single rod end type liquid spring. The present invention also comprehends the use of a double rod end type liquid spring as described in U.S. application Ser. No. 07/927,795 and incorporated herein by reference. The liquid spring 200 is connected by its upper end mounting bracket 202 to the vehicle frame (not shown), and by its lower end mounting bracket 204 to the support structure (not shown) of its associated wheel, and operates to provide the requisite suspension system spring and damping forces at its associated wheel location.

Liquid spring 200 includes an elongated, generally vertically oriented tubular housing 218 having an upper end 220 and a lower end 222. An upper annular gland member 226 is threaded into the upper housing end 220 and a lower annular gland member 230 is welded or threaded to the lower housing end 222.

The gland members 226 and 230 define within the housing 218 interior a chamber 236 which contains a compressible liquid. An annular piston 240 is vertically reciprocable within the chamber 236 and divides it into an upper "rebound" chamber 236a, and a lower "jounce" chamber 236b. An elongated hollow cylindrical rod structure 246 is coaxially secured to the annular piston 240 at a lower end and coaxially secured to upper mounting bracket 202 at an upper end. Rod structure 246 has a cylindrical interior chamber 253 extending from its upper end 257 to its lower end 256 and passing through the central opening in annular piston 240. Interior chamber 253 decreases the weight of the rod structure 246, simplifies its manufacture, and allows for the incorporation of an integral position sensor as described hereinbelow.

The rod structure 246 is slidably and sealingly carried within a suitable seal structure 258 in upper gland member 226 as known in the art. An upper end portion of rod structure 246 is extended upwardly through resilient jounce bumper 262 which abuts against bounce pad cavity 263 when rod structure 246 is fully extended into the chamber 236.

With the vehicle at rest, the portion of the vehicle weight borne by the wheel structure associated with the liquid spring 200 exerts a downward axial force on the rod structure 246, tending to force it further into the chamber 236. Downward movement of rod structure 246 in this manner progressively decreases the volume of the compressible liquid within the chamber 236 due to the increased space occupied by the progressively extending rod structure 246. This volume decrease, in turn, increases the pressure of the compressible liquid within the chamber 236, which exerts a progressively increasing net upward force on rod structure 246 and piston 240. This force tries to push the rod structure 246 back out of the chamber 236. When this net, upwardly directed fluid pressure force on the rod structure 246 and piston 240 equals the portion of the vehicle weight borne by its associated wheel structure, the piston 240 will be at a vertical equilibrium point within the housing chamber 236—a point which, as a general proposition, establishes the "ride height" of the vehicle when it is at rest or traveling along essentially level terrain.

When an additional, upwardly directed "jounce" force is imposed upon the wheel structure, the housing 218 is moved further upwardly along the rod structure 246 in a manner further inserting the rod structure 246 into the chamber 236, thereby progressively increasing the compressible liquid pressure and the net upward pressure force on the rod structure 246 and piston 240. When the upward wheel structure force is decreased, for example when the wheel structure travels downwardly through the "rebound" portion of its overall wheel stroke, the internal compressible fluid pressure force within the housing 218 acts to drive the housing downwardly relative to the rod structure 246. In this manner, the rod travel-responsive pressure variations in the compressible fluid provide the liquid spring 200 with the "spring" portion of its overall suspension action. Energy is stored within the compressible liquid during jounce and released from the compressible liquid during rebound.

The "damping" portion of the liquid spring 200's overall suspension action is accomplished in the present invention by permitting compressible liquid bypass flow across or around piston 240 from jounce chamber 236b and into rebound chamber 236a as the housing 218 is deflected upwardly relative to the piston 240, and controllably permitting compressible liquid bypass flow across or around the piston 240 from rebound chamber 236a and into jounce chamber 236b as the housing 218 is deflected downwardly relative to the piston 240. Such damping bypass flow is representatively provided for by means of low speed and medium speed disc deflection and high speed passages. Also, adjustable damping can be accomplished by activating a solenoid that allows low speed (stage 1) flow to be changed under the control of a master controller. Such bypass flow is discussed in greater detail hereinbelow with reference to FIGS. 4 and 5.

A coupling 250 is provided which is in fluid communication with chamber 236. Coupling 250 allows a secondary, external volume (not shown in FIG. 1) of compressible fluid to be selectively placed in fluid communication with the compressible fluid in chamber 236. As described hereinbelow with reference to FIG. 2, this allows the liquid spring 200 to exhibit two different spring rates, depending on whether or not the secondary volume is coupled to the chamber 236 volume. A more complete description of this feature of the present invention is described hereinbelow with reference to FIG. 3.

In a liquid spring vehicular suspension system, it is sometimes desirable to know the relative amount of extension of rod structure 246 into the chamber 236. The liquid spring 200 of FIG. 1 provides an internal position sensor within the liquid spring 200, thereby isolating the position sensor from environmental hazards which have limited the effectiveness of prior art position sensors. A metallic cylindrical position sensor rod 252 is fixedly attached to lower gland member 230 by means of a non-metallic nut 254. An upper end of cylindrical rod 252 extends into the hollow interior of metallic rod structure 246 and therefore will create an electrical capacitance proportional to the amount of extension of the position sensor rod 252 into the rod structure 246. Because the position sensor rod 252 is fixed relative to the chamber 236, the portion of cylindrical rod 252 which extends into the interior of rod structure 246 is directly proportional to the amount of extension of rod structure 246 into chamber 236. A nylon spacer (not shown) at the top of position sensor rod 252 (or other convenient method) is used to isolate position sensor rod 252 from the rod structure 246. The space between sensor rod 252 and rod structure 246 is filled with the compressible liquid, which acts as the dielectric material.

The capacitance formed between the sensor 252 and the rod structure 246 can be calculated by the expression:

$$C=8.5*ER*[((b/a)+1)/((b/a-1)]$$

where C is the capacitance in picoFarads/foot, ER is the dielectric constant (relative to air) of the compressible fluid used to fill the liquid spring, and (b/a) is the ratio of the radii of the inside and outside plates of the capacitor (252 and 246, respectively). It can therefore be seen that a linear change in capacitance between members 252 and 246 will occur which is proportional to the amount of extension of rod structure 246 into chamber 236. Since position sensor 252 is electrically isolated from the body of the assembly and coupled to a wire 265 brought outside the liquid spring 200, it is therefore possible to externally measure the relative positions of position sensor 252 and rod structure 246 by measuring the capacitance between them.

If the diameters of the position sensor rod 252 and rod structure 246 are uniform, the change in capacitance during jounce and rebound will be linear and thus be used to determine the relative positions of the rod structure 246 and chamber 236. Additionally, by monitoring the rate of change of the capacitance, the direction of movement, velocity and acceleration of the wheel structure may be determined, in addition to its position. Such information can be used by a control system (such as the system of FIG. 3) to change the vehicular suspension settings based on this information.

Figure 2:
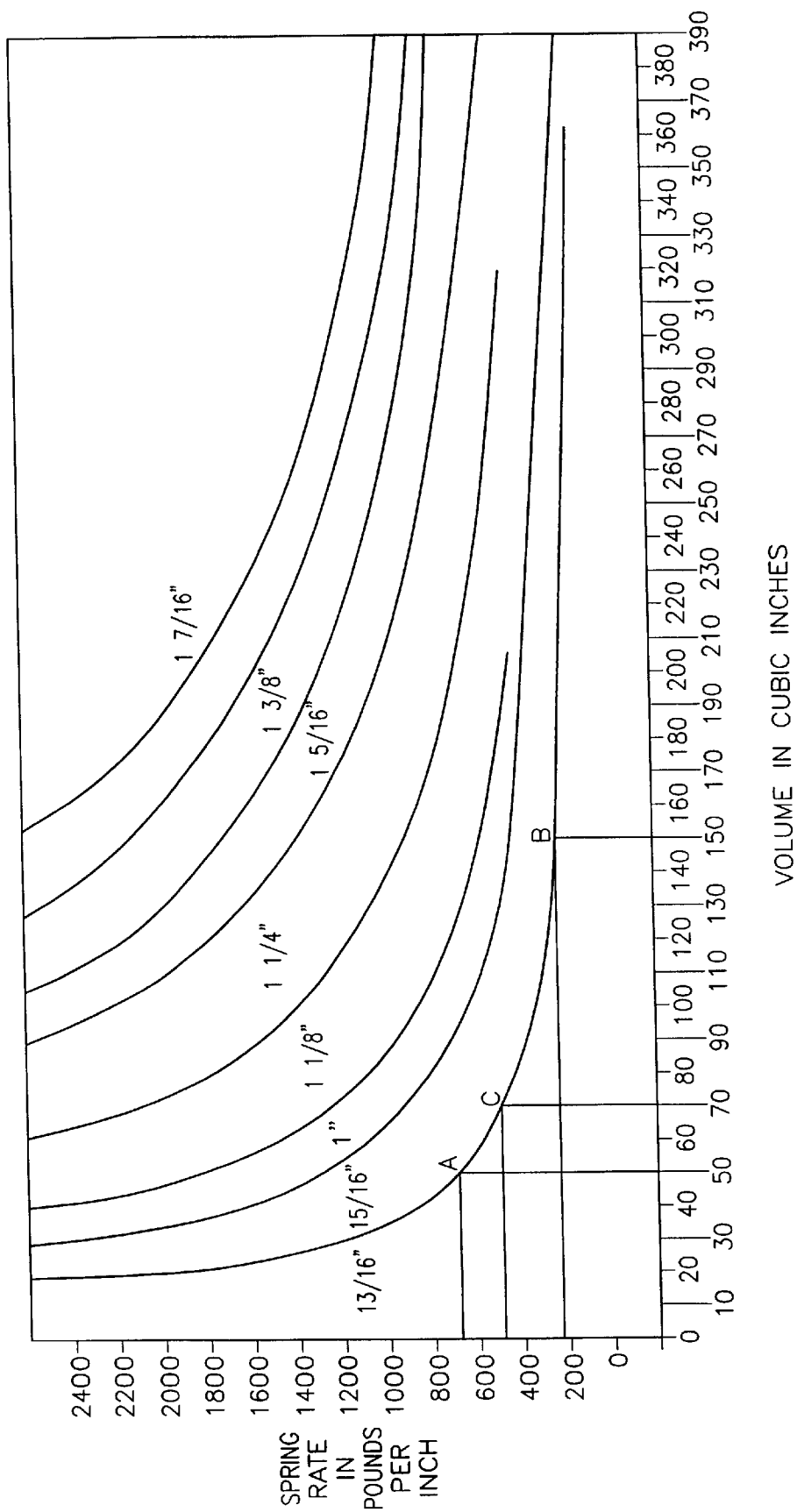
FIG. 2 is a graph showing the spring rate variation versus chamber volume of the liquid spring device of FIG. 1 in which the effect of rod diameter is illustrated parametrically.

Referring now to FIG. 2, there is shown a graph detailing the variation in spring rate versus total chamber volume for the liquid spring device 200 of FIG. 1, and any other volumes connected thereto (as will be explained hereinbelow with reference to FIG. 3). The curves plotted in FIG. 2 are determined by experimental measurement at constant temperature and one inch of rod travel for an array of rod diameters. Consequently, the larger the rod 246 diameter, the greater the spring rate for any given chamber 236 volume. The fact that there is a knee in the compressible liquid spring rate curve allows a wide range of spring rates to be set for any given liquid spring device 200 by variation of only the liquid chamber 236 effective volume.

To illustrate this point, assume that the outside diameter of a rod 246 of a liquid spring 200 is 13/16 inches. The spring rate of the liquid spring will therefore lie somewhere on the curve 400, depending on the chamber 236 volume. Assume that the chamber 236 volume is designed to encompass 50 cubic inches. The spring rate would then lie at point A, which indicates that for a rod 246 diameter of 13/16 inches, a chamber 236 volume of 50 cubic inches corresponds to a spring rate of 720 lbs/inch. This spring rate will provide a substantially stiff or firm ride for the vehicle that the liquid spring 200 supports. Such a spring rate provides good vehicle handling, such as during cornering, but many passengers find such stiffness to be uncomfortable when traveling over bumps and other road surface irregularities. Now assume that the chamber 236 volume is instead designed to encompass 150 cubic inches. The spring rate would then lie at point B, which corresponds to a spring rate of 240 lbs/inch. This spring rate will provide a substantially soft or pliant ride for the vehicle which the liquid spring 200 supports. Such a spring rate is adequate for a vehicle traveling in a straight line, as it absorbs the shock of bumps and other road surface irregularities, but it does not provide very good cornering support, allowing the vehicle body to roll excessively during a turn. In the past, designers have been forced to select either a high spring rate (such as point A) or a low spring rate (such as point B) as the suspension setting for the vehicle, which requires a trade-off between passenger comfort and vehicle handling. However, with the liquid spring 200 of the present invention, the spring rate may be alternated between points A and B, as desired, for proper handling of the vehicle as well as the comfort of passengers.

Figure 3:
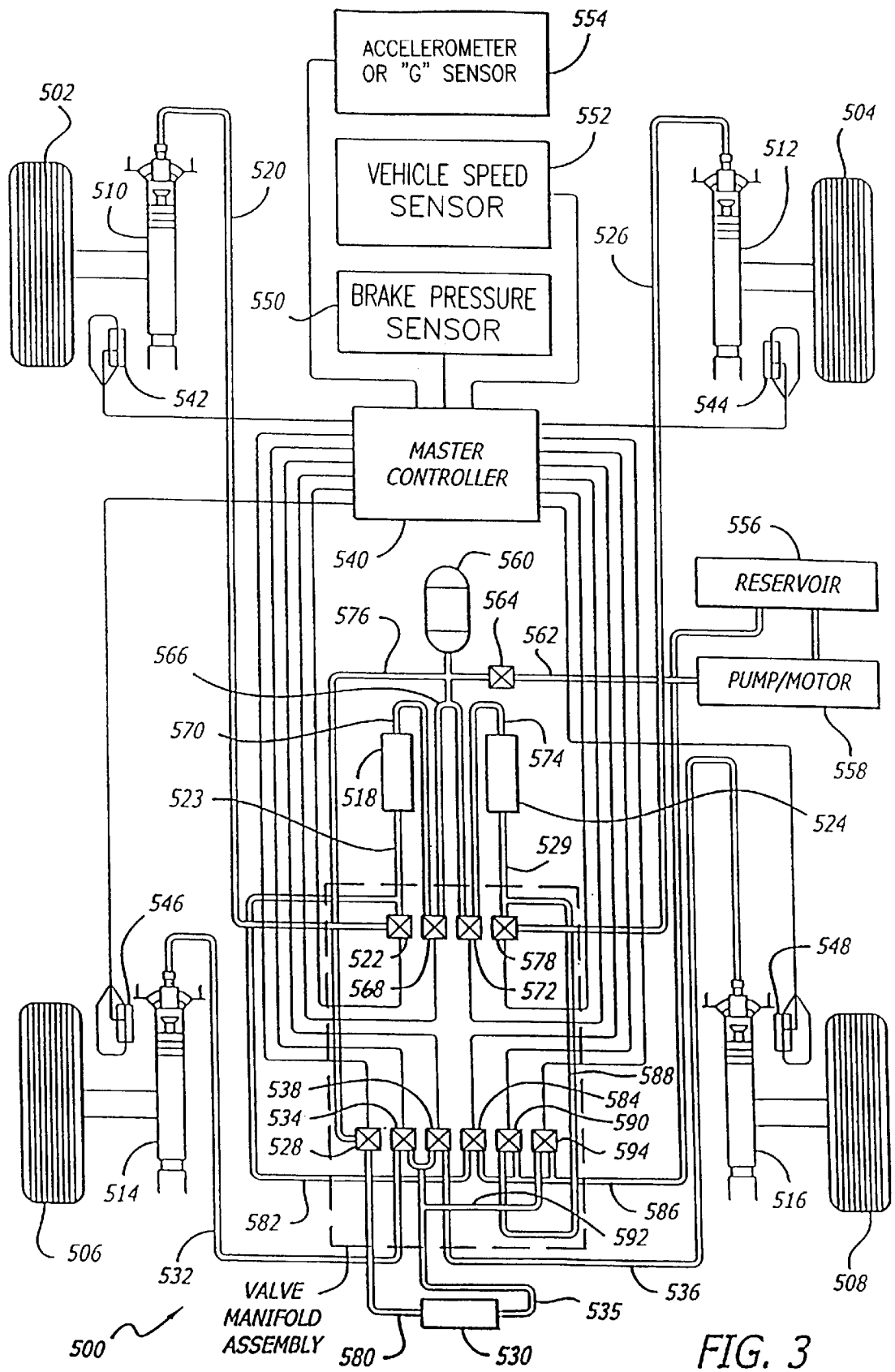
FIG. 3 is a schematic diagram of a liquid spring vehicular suspension system.

The changing of the spring rate is accomplished by use of the liquid spring's ability to couple its chamber 236 volume to a second volume of compressible liquid (see FIG. 3) by the opening of solenoid stabilizer valve (see FIG. 3). The second volume of compressible liquid may be located remotely from liquid spring 200.

If the chamber 236 volume is V1 and the second volume is V2, opening the solenoid stabilizer valve coupling V1 and V2 effectively makes the liquid spring chamber volume increase from V1 to (V1+V2), switching the spring rate from point A to point B (assuming V1=50 cubic inches and V2=100 cubic inches). If the solenoid stabilizer valve is closed, isolating V2 from V1, the spring rate immediately returns to point A.

The choice of spring rates for any particular liquid spring is not limited only to two settings, such as points A and B. The liquid spring chamber 236 volume may be selectively coupled to several external volumes of varying sizes. The spring rate may then be adjusted to a different value for each different external volume. For example, the liquid spring 200 described above, having a chamber 236 volume of 50 cubic inches and a second volume of 100 cubic inches, may be designed so that a third volume V3=25 cubic inches can be coupled to the chamber 236 volume through another solenoid valve. This allows the spring rate to be set at point C, or 500 lbs/inch, when V1 and V3 are coupled. The liquid spring 200 may now be adjusted to any one of three spring rates A, B or C (240, 500 or 720 lbs/inch, respectively) by the appropriate opening or closing of the associated solenoid valves. It is also possible to couple V1, V2 and V3 together simultaneously by opening both solenoid valves at the same time.

Note that it is desirable, but not necessary, to design the liquid spring 200 to have a chamber 236 volume corresponding to the highest desired spring rate. This allows the liquid spring to be constructed using the smallest possible chamber 236 volume (corresponding to the highest desired spring rate), resulting in a liquid spring which is relatively compact and lightweight, while the larger, heavy volumes associated with the lower spring rates may be located remotely via interconnecting lines. The increased compactness of the liquid spring facilitates its mounting in the vehicle, while its reduced weight reduces the unsprung weight of the vehicle. Because it is primarily the pressure wave that communicates between the chamber 236 volume and the external volumes, there is no disadvantage to remotely locating the external volumes.

Referring now to FIG. 3, there is illustrated a schematic diagram of a liquid spring vehicular suspension system of the present invention, indicated generally at 500. The vehicle is represented schematically by left front wheel 502, right front wheel 504, left rear wheel 506 and right rear wheel 508. The suspension system includes four liquid springs: left front spring 510, right front spring 512, left rear spring 514 and right rear spring 516. The connection between each spring 510–516 to each wheel 502–508 is represented schematically. In practice, each liquid spring will be coupled between the frame of the vehicle and the respective wheel support structure.

Left front spring 510 is coupled in fluid communication with secondary volume 518 via line 520, solenoid stabilizer valve 522, and line 523. Right front spring 512 is coupled in fluid communication with secondary volume 524 via line 526, solenoid stabilizer valve 578, and line 529. Left rear spring 514 is coupled in fluid communication with secondary volume 530 via line 532, solenoid stabilizer valve 534, and bifurcated line 535. Right rear spring 516 is also coupled in fluid communication with secondary volume 530, but the connection is made via line 536, solenoid stabilizer valve 538, and bifurcated line 535. The secondary volume connection to each liquid spring 510–516 is made via upper end 257 (see FIG. 1).

The vehicular suspension system 500 contains a fluid reservoir 556 for collecting and storing excess fluid in the system. This excess fluid may be utilized by pump/motor 558 to charge accumulator 560 to a predetermined pressure. Fluid is pumped into accumulator 560 via line 562 and check valve 564. Pressurized fluid in accumulator 560 may be supplied to secondary volume 518 through bifurcated line 566, solenoid fill valve 568 and line 570. Pressurized fluid in accumulator 560 may similarly be supplied to secondary volume 524 through bifurcated line 566, solenoid fill valve 572 and line 574. Additionally, pressurized fluid in accumulator 560 may be supplied to secondary volume 530 through line 576, solenoid fill valve 528 and line 580.

Excess fluid may be removed from the secondary volumes 518, 524 and 530 and deposited into reservoir 556. For this purpose, secondary volume 518 is coupled to reservoir 556 via lines 523 and 582, solenoid drain valve 584 and trifurcated line 586. Similarly, secondary volume 524 is coupled to reservoir 556 via lines 529 and 588, solenoid drain valve 590 and trifurcated line 586. Additionally, secondary volume 530 is coupled to reservoir 556 via lines 535 and 592, solenoid drain valve 594 and trifurcated line 586.

Solenoid valves 522, 528, 534, 538, 568, 572, 578, 584, 590 and 594 may be actuated by electrical signals from master controller 540. Master controller 540 is preferably a digital microprocessor, but may also comprise an analog control system.

Master controller 540 receives input signals from left front height sensor 542, right front height sensor 544, left rear height sensor 546 and right rear height sensor 548. Height sensors 542–548 are operable to generate an electrical signal representative of the relative displacement between the vehicle frame and the wheel support assembly, which corresponds to the relative displacement of rod structure 246 into chamber 236. Master controller 540 receives additional input signals from brake pressure sensor 550, which generates an electrical signal indicating that the vehicle braking system has been activated, and vehicle speed sensor 552, which generates an electrical signal indicating the speed of the vehicle. Additionally, master controller 540 receives an electrical signal indicative of turning motion of the vehicle from sensor 554. Sensor 554 may be an accelerometer, or "g" sensor, which senses forces lateral to the direction of motion of the vehicle, or, preferably, sensor 554 may indicate when the steering wheel of the vehicle has been turned. The latter sensor method is preferable because it can give information to the master controller prior to any actual lateral movement of the vehicle. The master controller 540 uses the information provided by sensors 542–554 to alter the characteristics of the vehicular suspension system 500 as will be described in detail below.

As described hereinabove with reference to FIG. 2, the spring rate of each liquid spring 510–516 may be changed by the opening or closing of solenoid stabilizer valves 522, 578, 534 or 538 to couple or uncouple the secondary volumes 518, 524 or 530 to the respective liquid springs 510–516. For example, suppose each liquid spring 510–516 is constructed so that it has a chamber 236 volume of 50 cubic inches. Referring to FIG. 2, it is seen that with a rod 246 outside diameter of $13/16$ inches, the spring rate for each liquid spring 510–516 will be 720 lbs/in. This corresponds to point A on the graph of FIG. 2. Assume, for example, that secondary volume 518 contains 100 cubic inches of compressible fluid. If spring 510 is coupled in fluid communication with secondary volume 518 by the opening of solenoid stabilizer valve 522, the spring rate will almost instantaneously change to 240 lbs/in. This corresponds to point B on the graph of FIG. 2. By opening and closing solenoid stabilizer valve 522, the spring rate of left front spring 510 may be alternated between 720 and 240 lbs/in. A similar adjustment of the spring rate of the right front spring 512 may be made by the opening and closing of solenoid stabilizer valve 578.

The liquid spring units 514 and 516 of the rear suspension may similarly be coupled or uncoupled to individual secondary volumes by the use of solenoid stabilizer valves. Alternatively, as shown in FIG. 3, rear liquid springs 514 and 516 may share a single secondary volume 530 which may be coupled to liquid spring 514 by means of solenoid stabilizer valve 534 and to liquid spring 516 by means of solenoid stabilizer valve 538. The use of the single secondary volume 530 allows the three discrete spring rates to be set for the rear liquid springs 514 and 516. For example, assume liquid springs 514 and 516 have chamber 236 volumes of 50 cubic inches each and that secondary volume 530 has a volume of 100 cubic inches. Assuming the solenoid stabilizer valves 534 and 538 remain open, in the situation where only one of the rear wheels is being displaced (left rear wheel 506, for example), the effective volume for the liquid spring 514 will be equal to the combination of the liquid spring 514 chamber 236 volume, the secondary volume 530 and the liquid spring 516 chamber 236 volume, or 200 cubic inches. In the situation where both rear wheels are being equally displaced, the liquid springs 514 and 516 equally share the secondary volume 530, resulting in an effective volume for each liquid spring 514 and 516 of 100 cubic inches. Accordingly, the liquid springs 514 and 516 may have effective volumes ranging between 50 and 200 cubic inches (assuming solenoid stabilizer valves open), depending upon their relative displacements.

In the situation where both solenoid stabilizer valves 534 and 538 are closed, each liquid spring 514 and 516 has an effective volume of 50 cubic inches. If solenoid stabilizer valve 534 is open and solenoid stabilizer valve 538 is closed, liquid spring 514 will have an effective volume of 150 cubic inches, while liquid spring 516 will have an effective volume of 50 inches. Because these differing effective volumes translate to differing spring rates (see FIG. 2), the single secondary volume 530 allows great flexibility in the spring rate of the rear liquid springs 514 and 516. Also, the sharing of the secondary volume 530 allows the position sensor data to be shared between sensors 546 and 548 to allow solenoid fill valve 528 to average the ride height process when the vehicle is not on a flat surface (three-point leveling).

Several changes in the suspension characteristics of the vehicle may be made by master controller 540 based on input data supplied to it by sensors 542–554. For example, when a vehicle that is traveling in a straight line turns from that course, the inertia of the vehicle mass, which attempts to maintain the vehicle on thee original straight course, creates a moment force which causes the vehicle body to apply more downward force to the side of the vehicle facing away from the direction of the turn (designated as the "outside"). This increased downward force is applied to the liquid springs on the outside of the vehicle, resulting in the familiar "body roll" exhibited by most cars and trucks during turning. It is desirable to eliminate as much of this body roll as possible in order to provide greater vehicle stability during turning maneuvers. Obviously, the "stiffer" the spring rate of the outside of the vehicle, the less body roll the suspension system 500 will allow. However, such a higher spring rate will often prove to be unacceptable during straight ahead cruising due to the inability of the high spring rate setting to smoothly absorb shocks from uneven road surfaces.

The vehicular suspension system 500 of the present invention solves this problem in the following manner. During normal straight ahead cruising, when a soft ride (i.e. low spring rate) is desired, the master controller maintains solenoid stabilizer valves 522, 578, 534 and 538 in the open position, thereby increasing the effective volumes of the fluid chambers of liquid springs 510–516. To continue the above example, this would set each liquid spring to operate at point B of FIG. 2, providing a low spring rate for a soft ride. When the driver of the vehicle turns the steering wheel to begin a turn, sensor 554 sends a signal indicative of this to master controller 540. The sensor 554 may preferably not generate a signal during steering wheel travel within some predefined "dead band" (this is the area of steering wheel travel about its centered position which has very little effect in actually turning the wheels of the vehicle). Upon receiving a signal from sensor 554 that, for example, a left turn is being executed, master controller 540 closes solenoid stabilizer valves 578 and 538, thereby decreasing the effective compressible liquid volumes of liquid springs 512 and 516. This causes the spring rates for liquid springs 512 and 516 to increase to point A of FIG. 2, thereby providing a stiffer suspension setting on the outside of the vehicle and decreasing the amount of body roll.

When the sensor 554 indicates that the steering wheel has returned to its centered position, master controller 540 opens solenoid stabilizer valves 578 and 538, thereby returning the spring rates of liquid springs 510 and 516 to point B of FIG. 2. In a preferred embodiment, master controller 540 will not implement the above-described roll control when the speed of the vehicle is less than 3 miles per hour (mph) or when the vehicle is moving rearward. This is because there is not a large enough inertial moment placed on the vehicle at these times to cause appreciable body roll.

An additional form of roll control may be included for vehicles with large side profile surface areas, such as buses and trucks. Such vehicles are subject to large tipping forces generated by the effect of wind acting upon their large side profile surface areas. Because this wind induced force produces the same effect upon the vehicle's suspension as does the cornering scenario described above, the roll control function of the present invention is equally effective in counteracting these wind induced effects. Thee only difference is that an additional sensor (not shown) is required which will signal the master controller 540 that the vehicle body is tilting about its center of gravity. When this happens, the master controller 540 may close the appropriate solenoid stabilizer valves to increase the spring rate of the liquid springs on the appropriate side of the vehicle, analogously to the sequence described hereinabove. It may additionally be desirable to maintain this anti-tipping control in an active state no matter what speed or direction the vehicle is traveling in, since the forces which induce the tipping are not related to the vehicle's speed.

The roll control of the vehicular suspension system 500 of the present invention described above provides the function traditionally performed by vehicle stabilizer bars, thereby allowing them to be eliminated. This is an important advantage of the present invention because stabilizer bars have several serious drawbacks. First, stabilizer bars counteract the body roll on one side of the vehicle by applying a torsional force which has the effect of applying an upward force to inside wheel of the vehicle during a turn. This torsional force undesirably lifts the inside wheel of the vehicle in addition to limiting body roll. The vehicular suspension system 500 of the present invention does not have this undesirable side effect. Additionally, the traditional stabilizer bars connect the vehicle wheel supports to the vehicle frame through hard rubber bushings. This arrangement allows the transmission of a high level of road noise to the passenger compartment of the vehicle. The use of the vehicular suspension system 500 of the present invention eliminates the stabilizer bars and, consequently, the associated noise transmission path. Lastly, stabilizer bars are traditionally constructed of steel. The use of the vehicular suspension system 500 of the present invention eliminates the stabilizer bars and, consequently, their weight.

Two important features of the vehicular suspension system of the present invention are made possible by the inclusion of the pump 558 and the accumulator 560. The first is the maintenance of relatively constant spring rate curves such as those shown in FIG. 2. Those curves assume a constant temperature of the compressible liquid within the liquid spring. However, it is not always feasible in a vehicle suspension environment to maintain the liquid spring compressible liquid at a constant temperature. Because the compressible liquid volume is proportional to temperature changes in liquid temperature may be counteracted by changing the pressure of the compressible liquid. Temperature changes are therefore controlled with the reservoir 556, pump/motor 558 and accumulator 560 system. The pump/motor 558 is controlled by the master controller 540, using inputs from the brake pressure sensor 550 and the compressible liquid pressure in the accumulator 560. The accumulator 560 is sized so that it provides the fill supply when a solenoid fill valve is opened, without the use of the pump/motor 558. Pump/motor 558 is used only to charge the accumulator 560. In an embodiment the Pump/motor 558 is only used while the brake pressure sensor 550 indicates that the vehicle's brakes have been applied. This prevents the pump/motor 558 from drawing energy from the vehicle except when braking. The environmental temperature characteristics of the compressible liquid are mitigated with the use of the solenoid fill valves 568, 572 and 528, and the solenoid drain valves 584, 590 and 594, the pump/motor 558 and the accumulator 560. Pressure variations in the compressible liquid due to temperature result in vehicle ride height variations which are sensed by the ride height sensors 542–548. The master controller 540 opens or closes selected solenoid fill or drain valves in response to inputs from the height sensors 542–548.

A second important advantage provided by the pump 558 and accumulator 560 is the ability of the vehicular suspension system 500 to automatically level the vehicle. Each height sensor 542–548 sends an individual signal to the master controller 540 indicating the height of the respective corners of the vehicle relative to the respective wheel support structures. In a preferred embodiment, each height sensor 542–548 has a null center position which causes it to output no signal to the master controller 540. The null center position corresponds to the desired position of the vehicle body. Each height sensor 542–548 is therefore capable of communicating to the master controller 540 whether the vehicle body at the respective corner is above or below the null center position.

In an embodiment, the master controller 540 will execute a three point leveling, wherein the two rear wheels are not leveled independently. If, for example, the height sensor 542 indicates that the left front corner of the vehicle is above the null center position, the master controller 540 will open solenoid drain valve 584, thereby releasing compressible fluid from secondary volume 518 into reservoir 556. Leveling only occurs when secondary volumes are coupled to the liquid springs. When height sensor 542 indicates that the left front corner of the vehicle is at null center, the solenoid drain valve 584 is closed. Likewise, if the height sensor 542 indicates that the left front corner of the vehicle is below the null center position, the master controller 540 will open solenoid fill valve 568, thereby adding compressible fluid from accumulator 560 into secondary volume 518. When height sensor 542 indicates that the left front corner of the vehicle is at null center, the solenoid fill valve 568 is closed. An identical procedure is used for the right front corner of the vehicle. Both rear wheels of the vehicle are leveled together using solenoid drain valve 594 and solenoid fill valve 528. The control signal to the solenoid drain valve 594 and/or solenoid fill valve 528 is provided by the master controller 540 after electrically averaging the outputs of both rear height sensors 546 and 548. With this technique, the attitude of the vehicle is established by the left front height sensor 542 and the right front height sensor 544, and the rear height sensors 546 and 548 provide a compromise height that allows for leveling on a surface that is not flat (i.e. non-planar).

It will be appreciated by those skilled in the art that a four point leveling system may be easily implemented in the present invention by the provision of a separate secondary volume, solenoid stabilizer valve, solenoid drain valve and solenoid fill valve for each rear wheel.

In an embodiment of the present invention, there are two constraints on the leveling control procedure described above. The first is that the vehicle must be moving forward. This prevents the vehicle from attempting to level while passengers are entering or exiting the vehicle. This additionally prevents the vehicle from leveling when a door of the vehicle is open, eliminating the possibility of lowering the vehicle to the point where the door makes contact with, for example, a curb. A second constraint on the automatic leveling feature is that the vehicle will not level unless the accumulator 560 pressure is at least 3400 pounds per square inch (psi). This guarantees that the accumulator 560 will have enough pressure to charge the secondary volume when its associated solenoid fill valve is opened.

In a preferred embodiment, the pump 558 is only activated to charge the accumulator 560 while the vehicle's brakes are applied and the speed is over 2 mph. This allows the accumulator to be charged without impacting the fuel economy of the vehicle as measured by the U.S. government's Corporate Average Fuel Economy (CAFE) standards. This very important advantage of the present invention allows the suspension system 500 to be incorporated into a vehicle without impacting CAFE measurements.

In another embodiment of the present invention, the vehicular suspension system 500 is capable of automatically exercising the leveling control while unattended. In this embodiment, the master controller 540 senses when the vehicle's doors have opened and closed, utilizing input from sensors already present on most vehicles. A further condition is that the ignition must be turned off, which is also conveniently sensed by any simple circuit as is known in the art. After a predetermined time period has elapsed since the occurrence of these two conditions, the master controller 540 "wakes up", and analyzes the output from each of the height sensors 542–548. Because of the variation in volume versus temperature inherent in compressible liquids, the compressible liquid in suspension system 500 may have caused the vehicle to sag or otherwise become unleveled since the system 500 last leveled the vehicle. If such is the case, the master controller activates the appropriate fill and drain solenoid valves (as described above) in order to relevel the vehicle. The master controller will "wake up" on predetermined intervals (for example, every 30 minutes) to re-execute this leveling procedure. In this way, the vehicle may be parked for extended periods of time (such as at an airport parking facility), but will be leveled when the owner eventually returns. A limitation on this automatic leveling feature is it will only occur when there is sufficient pressure in the accumulator 560 to charge the system 500. In other words, master controller 540 will not activate pump/motor 558 to achieve this leveling.

Several decisions made by the master controller 540, in one embodiment, are based upon input from the vehicle speed sensor 552. As discussed above, vehicle leveling is activated at all forward speeds. Vehicle roll control is activated at forward speeds from 3 to 80 mph. With forward speeds of over 80 mph, all solenoid stabilizer valves 522, 578, 534 and 538 are closed, thereby maintaining high spring rates at all four wheels. It will be appreciated by those skilled in the art that the above limitations based upon vehicle speed are designed choices, and that the present invention also comprehends other speed limits which are within the scope of the appended claims.

The vehicular suspension system 500 of the present invention is also capable of providing an anti-dive feature during vehicle braking. Upon receipt of a signal from brake pressure sensor 550, the master controller 540 closes solenoid stabilizer valves 522 and 578, thereby increasing the spring rate at both front wheels. This increased spring rate prevents the front of the car from "diving", or tilting forward due to the increased downward force on the front suspension components during braking. Similarly, an "anti-squat" feature may be provided that increases the spring rate of the rear liquid springs during hard acceleration.

Another important advantage of the vehicular suspension system 500 of the present invention is that it provides extremely good noise damping between the vehicle wheels and the passenger compartment compared to prior art suspension systems. This results from the fact that the liquid spring replaces the steel springs and steel stabilizer bars of a conventional suspension. The density of steel makes it a very good sound conductor, and the connection of the wheel support structure and the passenger compartment with these steel members is effective in transmitting road noise generated by the rolling resistance of the tires as well as impacts between the tires and bumps or potholes. In the liquid spring suspension system 500, the wheel support structures are isolated from the passenger compartment by the compressible liquid within each liquid spring. The compressibility of this liquid makes it an extremely inefficient sound and vibration transmitter. The result is that the passenger compartment is very well isolated from most of the road noise generated by the tires.

Still another important advantage of the liquid spring suspension system 500 is that the replacement of conventional struts, shocks, coil springs and stabilizer bars with the relatively compact liquid springs allows for substantially reduced vehicle cowl heights. This gives the vehicle body designer much greater freedom to implement designs which, because of desired coefficient of drag levels or aesthetic reasons, requires a lower front or rear body height.

It can thus be seen that the control system schematically depicted in FIG. 3 may be conveniently utilized to continuously and automatically adjust the spring force characteristics of the liquid springs 510–516 to generally optimize their suspension performance essentially regardless of what combination of road conditions and driver control inputs the operated vehicle encounters at a given instant.

Figure 4:
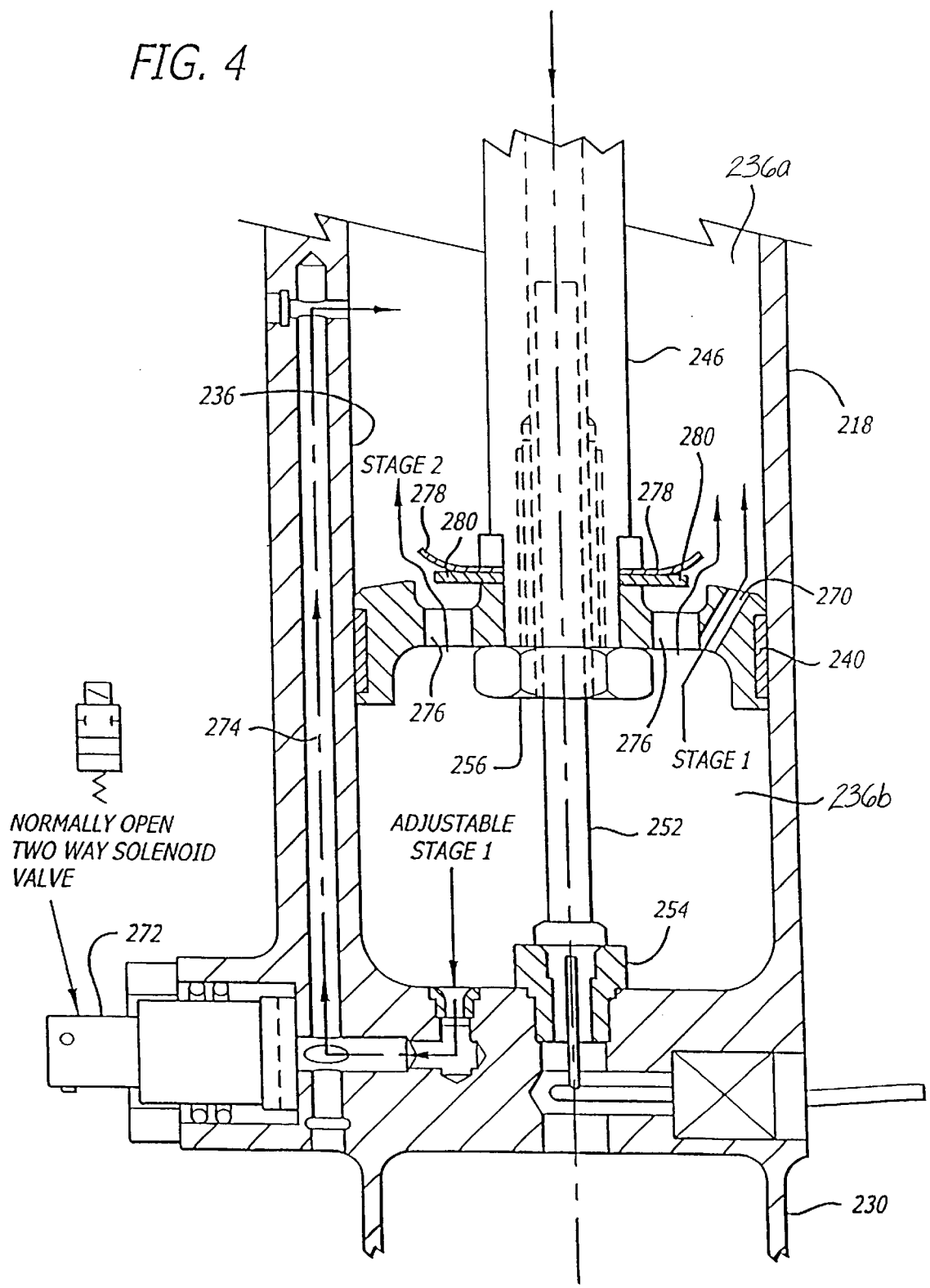
FIG. 4 is a schematic, partially cross-sectional illustration of the device of FIG. 1, showing compressible fluid flow during jounce.

Referring now to FIG. 4, there is illustrated a magnified view of a portion of the liquid spring 200 of FIG. 1, illustrating the operation of the adjustable and non-adjustable damping mechanisms during the jounce portion of wheel structure travel. During jounce, the piston 240 and rod structure 246 move downward relative to the housing 218, thereby decreasing the volume of jounce chamber 236b. Damping of liquid spring 200 is provided by flow of compressible liquid through and/or around piston 240. This compressible liquid flow occurs in two stages, depending upon the magnitude of the jounce force. Stage 1 liquid flow occurs through at least one passage 270 through piston 240 which places the jounce chamber 236b in fluid communication with the rebound chamber 236a. During any downward movement of the piston 240, compressible liquid will flow through passage 270 from the chamber 236b to the chamber 236a, thereby providing damping of the liquid spring 200. Additional stage 1 liquid flow is provided by means of solenoid flow valve 272 which is operable to variably restrict fluid flow through a passage 274, such restriction being variable from fully open to fully closed. The amount of restriction of the passage 274 imposed by solenoid flow valve 272 is controlled by a signal from master controller 540. At all times when solenoid flow valve 272 is at least partially open during a jounce stroke, stage 1 damping flow will occur in passage 274 coupling chambers 236b and 236a. The ability to vary the amount of flow through passage 274 with solenoid flow valve 272 allows for adjustability of the damping characteristics of the liquid spring 200.

At least one further opening in piston 240 is provided for stage 2 compressible liquid flow. Stage 2 flow occurs at some piston 240 displacement force greater than that necessary for stage 1 flow (it will be appreciated by those skilled in the art that stage 1 flow continues after initiation of stage 2 flow). Passages 276 are covered by dual flexible membranes 278/280 which prevent fluid flow from chamber 236b to chamber 236a during stage 1. Membranes 278/280 cover the openings to passages 276 until some predetermined level of downward piston 240 force is generated which is strong enough to flex the membrane 278, thereby allowing fluid flow from chamber 236b, through passages 276 and into chamber 236a.

Figure 5:
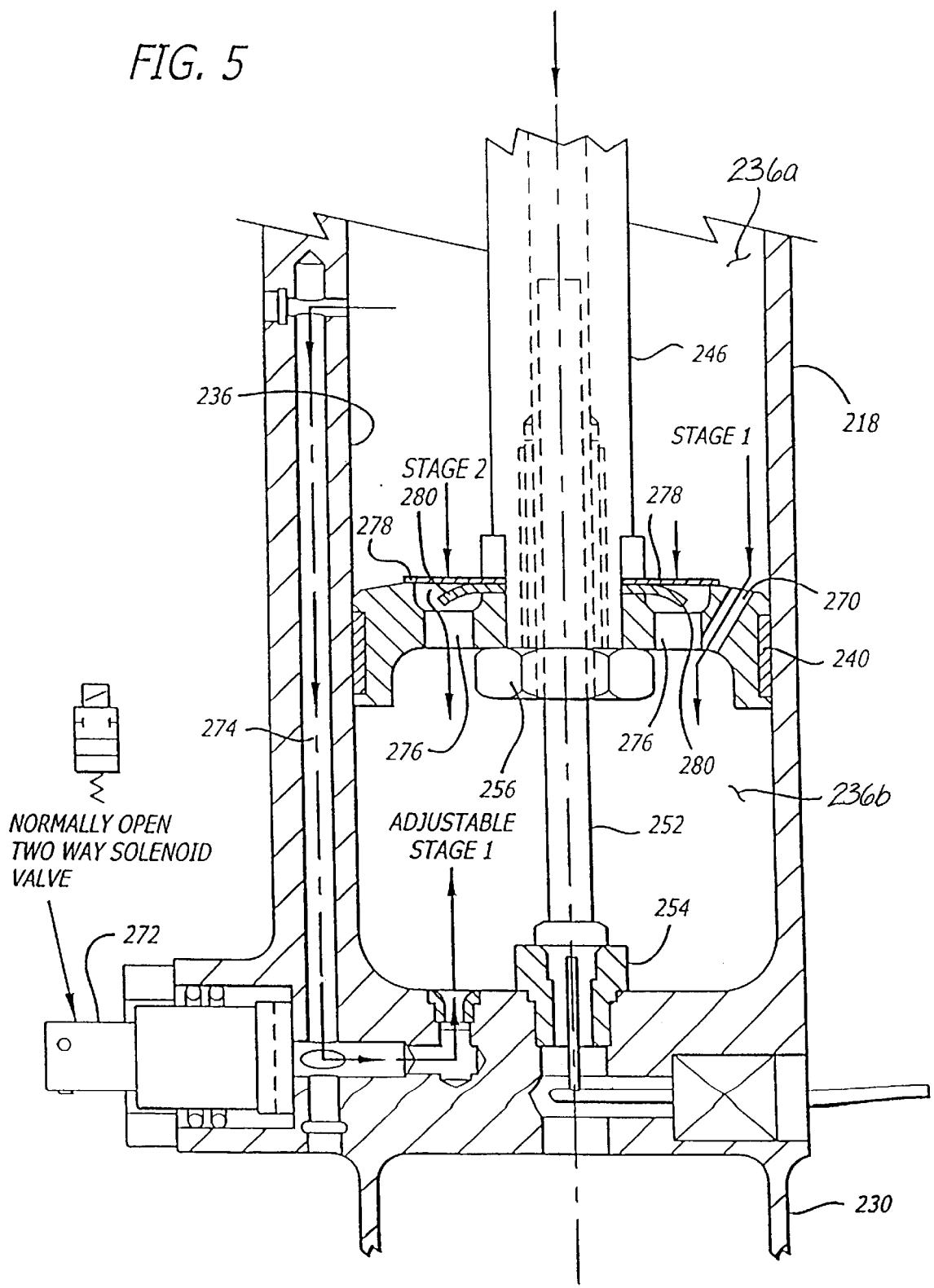
FIG. 5 is a schematic, partially cross-sectional illustration of the device of FIG. 1, showing compressible fluid flow during rebound.

Referring now to FIG. 5, the same portion of liquid spring 200 is illustrated in magnified view, except that the piston 240 is now traveling upward with respect to housing 218 during a rebound stroke. This upward movement of the piston 240 causes increased pressure in the rebound chamber 236a, thereby immediately initiating stage 1 compressible liquid flow through passage 270. Additional stage 1 flow will occur through passage 274, depending upon the flow restriction imposed by solenoid flow valve 272. During stage 1 flow, membranes 278/280 are forced downward, closing off passages 276. Stage 2 flow begins when the upward displacement of piston 240 is great enough to cause membrane 280 to flex downward under the force of compressible fluid flowing through an opening (not shown) in membrane 278. When this occurs, stage 2 flow allows compressible liquid to pass from chamber 236a, through the opening in membrane 278 and passages 276 and into chamber 236b. In both the jounce and rebound strokes, the combination of the two-stage fluid flow with the adjustable fluid flow through passage 274, allow for design of nearly linear damping characteristics for the liquid spring 200.

It should be noted that the schematically illustrated suspension system 500 is merely representative and could be modified in a variety of manners if desired. For example, the liquid springs 510–516, while illustrated as a single rod end type, could also be of the double rod end type, and could be interconnected between the vehicle frame and wheel structures in a variety of alternate manners and orientations. The sensing of the housing 218 and rod structure 246 positions could be achieved in a variety of alternate manners, as could the damping bypass flow across piston 240. For example, the position sensor rod 252 may be made of plastic with a vacuum coated metallic covering layer. Further, the volume adjustment mechanisms could be structured and controlled differently, and more than one secondary volume may be used with each liquid spring 510–516. Additionally, the number and type of input signals to master controller 540 could be varied to suit a particular suspension application.

Figure 6:
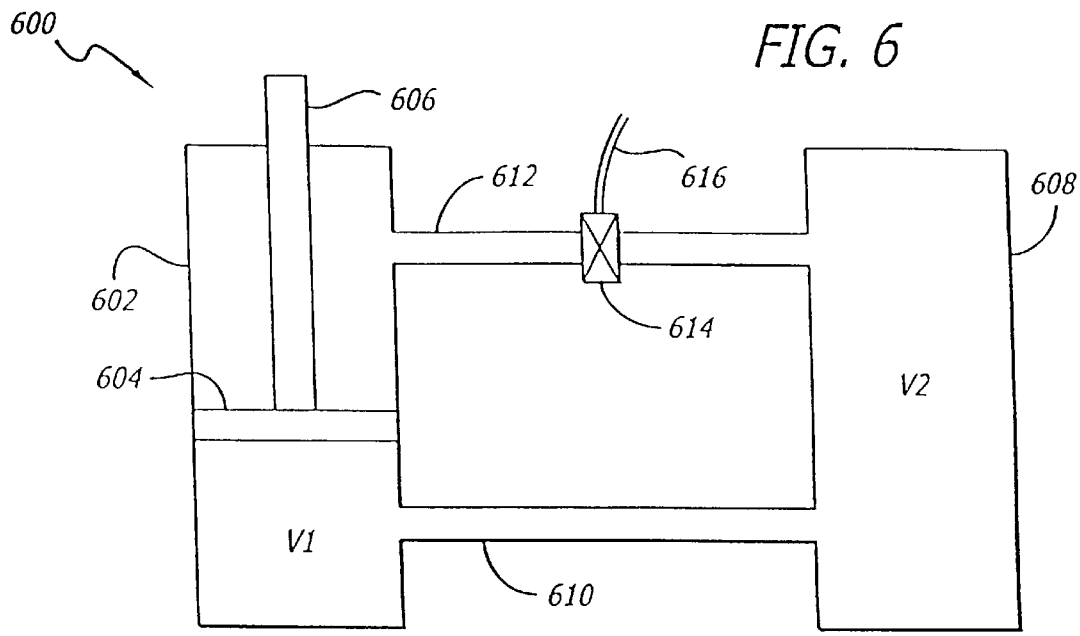
FIG. 6 illustrates an alternative embodiment of the two-volume spring system.

Referring now to FIG. 6, a further embodiment of the present invention is indicated generally at 600. The liquid spring 600 achieves the same variable spring rate effect of the present invention without having "two" volumes in a literal sense. As with the previous embodiments discussed herein, the device 600 has a liquid spring chamber 602 which defines and contains a first volume of compressible fluid V1. The volume V1 is divided into jounce and rebound chambers by a piston 604 coupled to a piston rod 606 for longitudinal translation within the chamber 602. A secondary volume V2 is defined and contained by a second chamber 608. The volumes V1 and V2 are coupled via a fluid passage 610 which is a continuously open orifice. Therefore, in a literal sense, the volumes V1 and V2 are a single volume. However, as will be described hereinbelow, the fluid passage or orifice 610 may be designed so that V1 and V2 behave as separate volumes for the purposes required to provide variable spring rate for the liquid spring 600. The volumes V1 and V2 are further coupled by a second passage or orifice 612. The passage 612 may be selectively opened or closed by a solenoid valve 614 which is controlled by a suspension system controller (not shown) via cable 616. The passage 612 is large enough (or has a low enough fluid resistance) to allow substantially fast pressure equalization between volumes V1 and V2 when the solenoid valve 614 is opened.

The handling characteristics of the vehicle supported by the liquid spring 600 are partially determined by the spring rate of the liquid spring 600. The spring rate is determined by the compressibility of the compressible fluid contained within the volumes V1 and V2. For example, a fluid sold under the trade name Dow Corning 200 Fluid exhibits the compressible characteristics shown in FIG. 7. Such a fluid has the property that it develops pressure changes according to the percentage compression (cr %) of some defined volume of it, according to the following relationship:

relative pressure $(psi) = 93.6 * (cr \%)^2 + (732.7 * cr \%) - 60.9$

Figure 7:
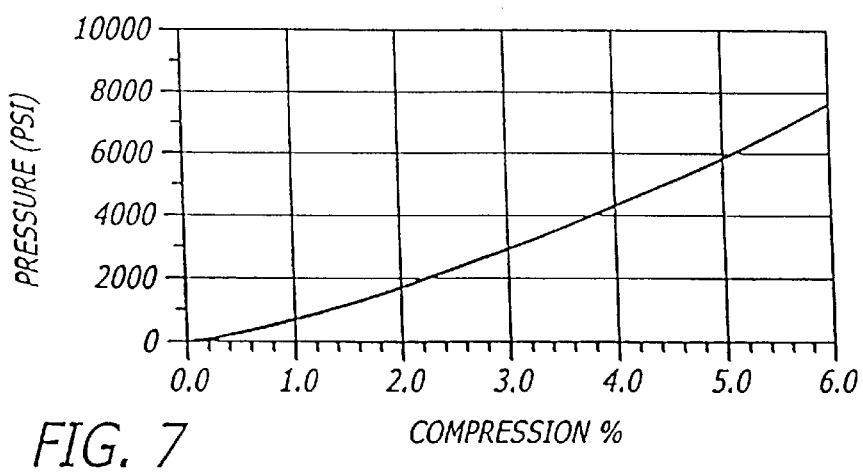
FIG. 7 is a graph illustrating the compressibility characteristics of an exemplary compressible liquid.

During the stroking of the piston 604, the percentage compression moves to the right in the graph of FIG. 7, causing the pressure within the volume V1 to increase. This pressure increase acts on the rod 606 to create a force increase proportional to rod movement, or in other words, a spring rate. During its operation, the state of the liquid spring 600 is determined by its position on the graph of FIG. 7.

Figure 8:
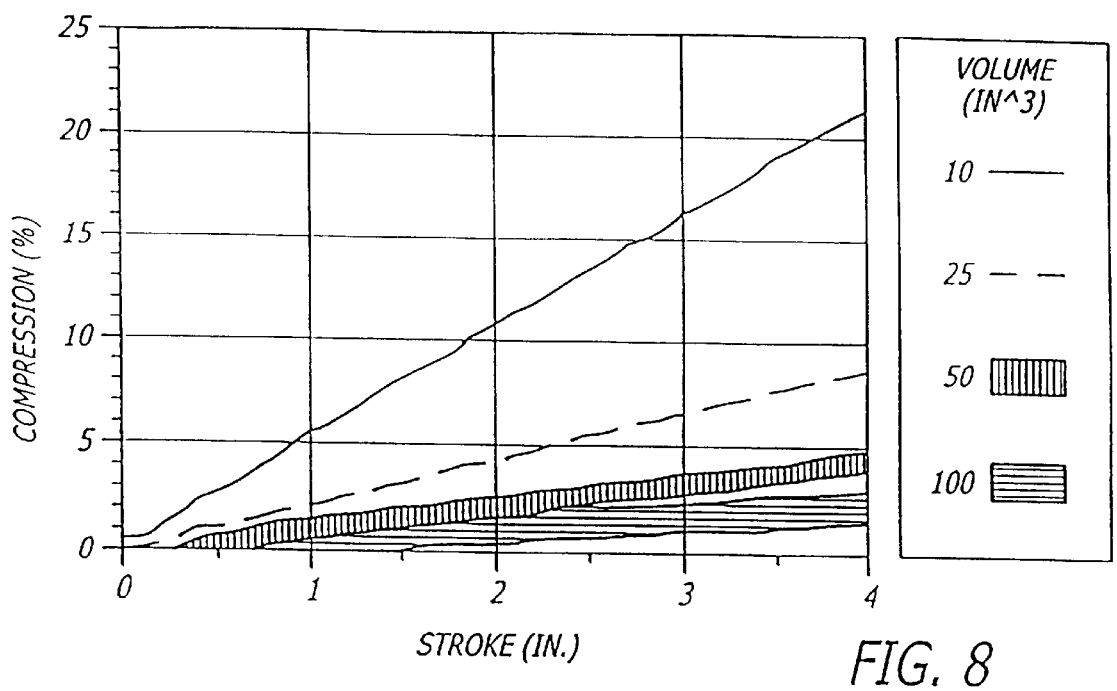
FIG. 8 is a graph illustrating the effect of decreased fluid volume on compression gain.

An important performance characteristic is achieved with the liquid spring 600 by varying the spring rate. In other words, the system controller may create a high spring rate or a low spring rate depending upon what is most desirable in light of current conditions. This change in spring rate is accomplished by changing the effective volume of compressible fluid. Reducing the volume of fluid increases the gain of percentage compression to rod 606 movement (stroke) as illustrated in the graph of FIG. 8. Thus, decreasing the volume increases the percent compression gain, thereby increasing relative pressure gain, which results in more force output from the liquid spring 600 for any given stroke. In other words, decreasing volume increases the spring rate and increasing volume decreases the spring rate.

For a typical liquid spring as shown in FIG. 6, the operating pressures in the liquid spring 600 would be in the range of 2000 to 3000 psi. For example:

| | |
|---|---|
| Rod 606 Diameter: | .75 inch |
| Rod 606 Area: | .44 inches$^2$ |
| Load on Liquid Spring 600: | 1000 lb |
| Pressure in Liquid Spring 600: | 1000 lb/.44 in$^2$ = 2272 psi |

This is for a typical automotive static condition. In the case of the same strut during a turning (roll) maneuver, where the load on the liquid spring 600 would increase with weight transfer during roll, the pressure in the liquid spring 600 would increase to the range of 3000 to 4000 psi. This can be seen as follows:

| | |
|---|---|
| Load increase due to weight transfer: | 600 lb |
| Total Load on Liquid Spring 600: | 1600 lb |
| Pressure in Liquid Spring 600: | 1600 lb/.44 in$^2$ = 3636 psi |

In this example, the pressure increase is about 1400 psi. The increase will typically range from 1000 to 2000 psi. During a turning maneuver, we want more roll resistance, hence a greater spring rate. To achieve a greater spring rate, we need to have a smaller volume. Therefore, the controller closes valve 614, effectively isolating V1 from V2, causing the entire pressure rise of 1400 psi to be experienced within the smaller volume V1. There is thus a pressure differential of 1400 psi between V1 and V2. In order for the liquid spring 600 to continue to exhibit the increased spring rate due to the smaller effective volume of fluid, this pressure differential between V1 and V2 must be maintained for the duration of the roll maneuver. If the pressure between the two volumes is allowed to equalize because of fluid flow through passage 610, then the effective volume of the liquid spring begins to look like V1+V2, with a resulting drop in spring rate. It will be appreciated by those skilled in the art that the preferred method of maintaining separation of the volumes V1 and V2 is to have complete closure of the fluid paths between the two volumes, as detailed hereinabove for other embodiments of the present invention. However, it is possible to have a continuously open connection between the two volumes and still maintain a pressure differential long enough to exhibit variable spring rates within the liquid spring 600.

In light of the previously discussed examples, it is clear that the valve 614 and constant line 610 between the volumes V1 and V2 should be able to maintain the required pressure differential between the volumes for the period of time it takes to execute the turning maneuver. Once the turning maneuver is complete, the controller will open the valve 614 and equalize the pressures quickly. In order to achieve this effect, the constant line 610 must exhibit a high resistance to fluid flow. A simple way to calculate the required resistance of the constant line 610 is to use the Lee Company Liquid Flow Calculation (page M-9, Lee Technical Hydraulic Handbook, 1989, The Lee Company, Westbrook Conn.). This calculation is as follows:

$$L = (20)\,(V/I)\sqrt{0}(H/S)$$

where

L=Fluid Flow Resistance (Lohms)

H=Differential Pressure (psi)

I=Fluid Flow Rate (gpm)

S=Specific Gravity of Liquid

V=Viscosity Compensation Factor (p. M-11)

As a simplifying assumption, the calculation can be made for the required resistance at a constant load and thus a constant differential pressure. This is approximated by a vehicle in a steady constant radius turn. In this case, all flow through the constant line 610 would result increased stroke. The amount of increased stroke can be calculated using the following relationship:

$$\text{Rod Velocity} \propto (\text{Flow Rate})/(\text{Rod Area})$$

$$\text{Rod Velocity}\,(in/sec) = [I/(\text{Rod Area})] * [230/60]$$

The above two relations are two equations containing two unknown variables (Flow Rate and Resistance). Solving the bottom equation for Flow Rate, substitution of this relationship into the equation and solving for Rod Velocity gives the following relationship:

$$\text{Rod Velocity}\,(in/sec) = (20)*(231/60)*[V/\text{Rod Area}(L)]*[\sqrt{}(H/S)]$$

Figure 9:
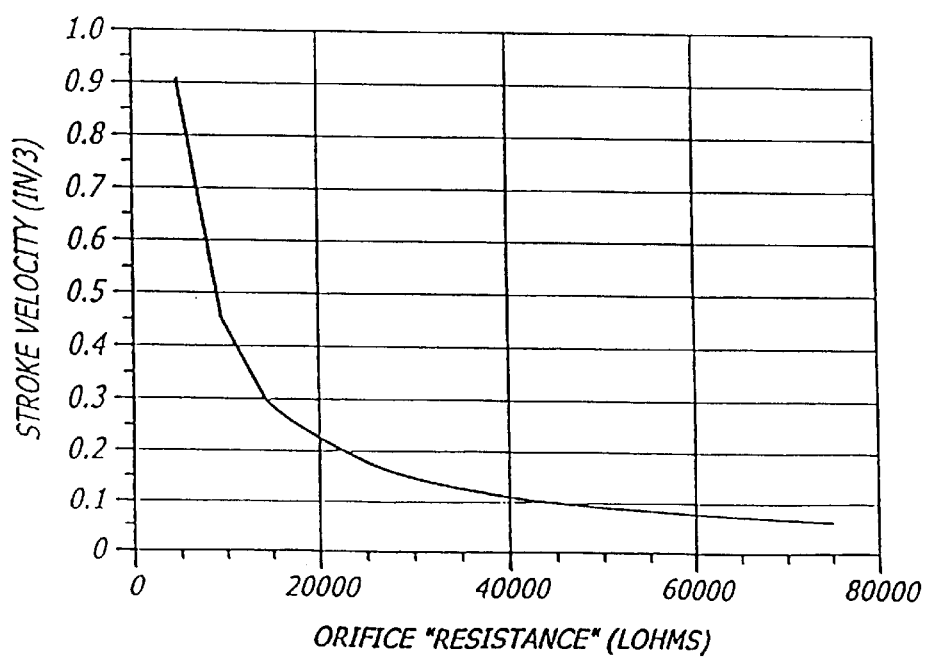
FIG. 9 is another graph which illustrates the relationship between stroke velocity and the orifice resistance.

This equation was used to calculate the data for the graph of FIG. 9, assuming a 21 mm rod diameter. For best handling stability, the rod 606 motion should be kept under 0.25 inches. Assuming a maximum turning time period of 5 seconds, this means that stroke velocity should be no more than 0.05 in/sec. Thus, the constant line 610 of FIG. 6 should have fluid resistance approaching 80,000 Lohms. Such a resistance may easily be accomplished using a small diameter orifice or introducing some sort of swirling or turbulence to the fluid. The Lee Company Catalog contains many such restrictor devices that can provide such performance.

An alternative arrangement of the embodiment of FIG. 6 is shown schematically in FIG. 10 and indicated generally at 1000. The liquid spring 1000 includes a chamber defined by cylindrical body 1002. This chamber is divided into two volumes, V1 and V2, by a fixed bulkhead 1020. The volume V1 is further divided into jounce and rebound chambers by piston 1004, which is coupled to rod 1006. The fixed bulkhead 1020 contains a constant open orifice 1010 as well as a variable valve 1014 which is under the control of a system controller (not shown). The configuration of FIG. 10 is analogous to that of FIG. 6, and the design parameters that apply to the constant line 610 also apply to the constant orifice 1010.

Figure 12:
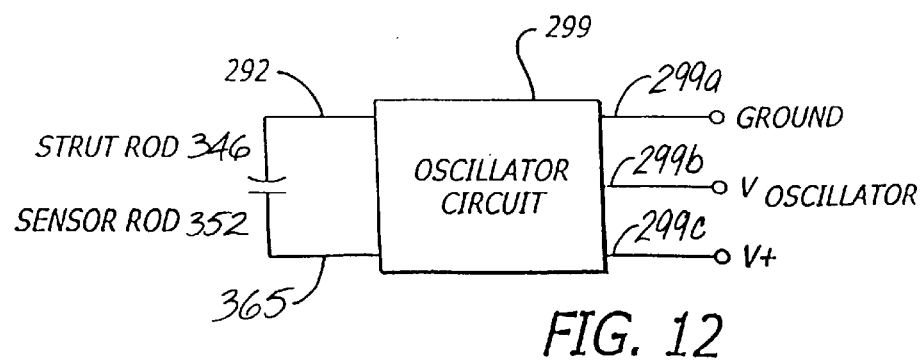
FIG. 12 is a schematic of the position transducer.

As discussed above in reference to FIG. 1, the capacitance between the hollow strut rod 246 and the sensor rod 252 will vary according the amount of extension of the sensor rod 252 into strut rod 246. The measured capacitance can be correlated to the ride height of the vehicle. However, in a much broader sense, a capacitive position transducer 1100 can be formed by a hollow rod structure 346 slidably engaged by a sensor rod 352. FIGS. 11 and 12 illustrate such a position transducer, which is suitable for any application including a ride height sensor for an automobile. The sensor rod 352 is separated from the hollow rod 346 by a dielectric, each acting like the opposing plates of a capacitor. The position transducer can be mounted between two surfaces by a first and second mounting bracket 294, 296 which are attached to the rods 346, 352 respectively. The clearance between the rods is maintained by seals 290 which must be made of a nonconductive material. An insulator nut 354, typically nylon, isolates the rod 352 from the mounting bracket 296.

A circuit is formed to measure this capacitance. A ground lead 292 is coupled to the hollow rod 346 while a second lead 365 is coupled to the sensor rod 352. A voltage applied across the rods provides a signal indicative of the amount of rod extension. An oscillator circuit 299 is placed in parallel with the rods. The oscillator circuit has three terminals: a ground terminal 299a, a $V_{oscillator}$ terminal 299b, and a V+ terminal 299c. The capacitance of the rods governs the output frequency of the oscillator circuit 299, i.e. the frequency of oscillation of the potential across terminals $V_{oscillator}$ 299b and ground 299a.

When the sensor rod 352 extends into the rod structure 346, the capacitance increases, causing a decrease in oscillatory frequency. Conversely, when the sensor rod 352 removes from the rod structure 346, the capacitance decreases, causing an increase in oscillatory frequency. The relative amount of extension of the sensor rod 352 in the rod structure 346 can therefore be determined as a function of the frequency of the oscillator circuit. In other words, decreasing frequency indicates a jounce condition, and increasing frequency indicates a rebound condition. Again, this capacitive position sensor is convenient for use in an automotive suspension for determining the position of a wheel structure, but can serve in any application where there is a requirement for sensing length, linear velocity, or linear acceleration.

Figure 13:
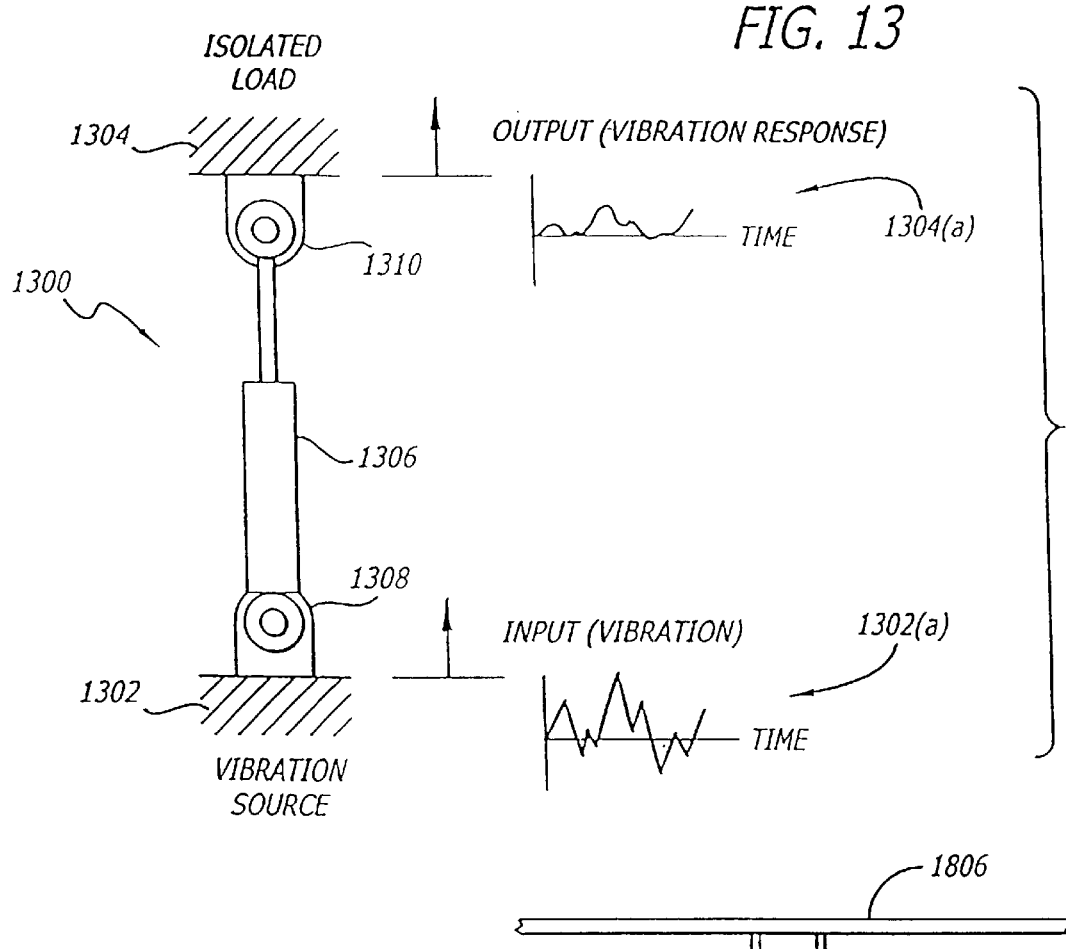
FIG. 13 illustrates the general embodiment of the present vibration control system mounted between a first mass and a second mass.
Figure 14:
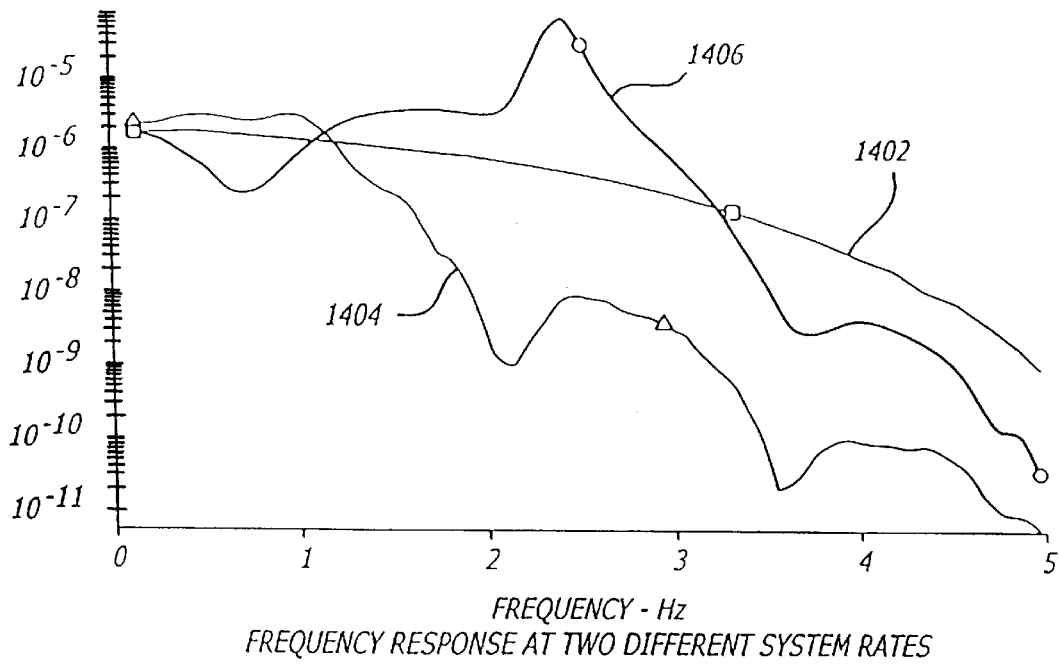
FIGS. 14 and 15 graphically illustrate experimental test data for the vibration control system.
Figure 15:
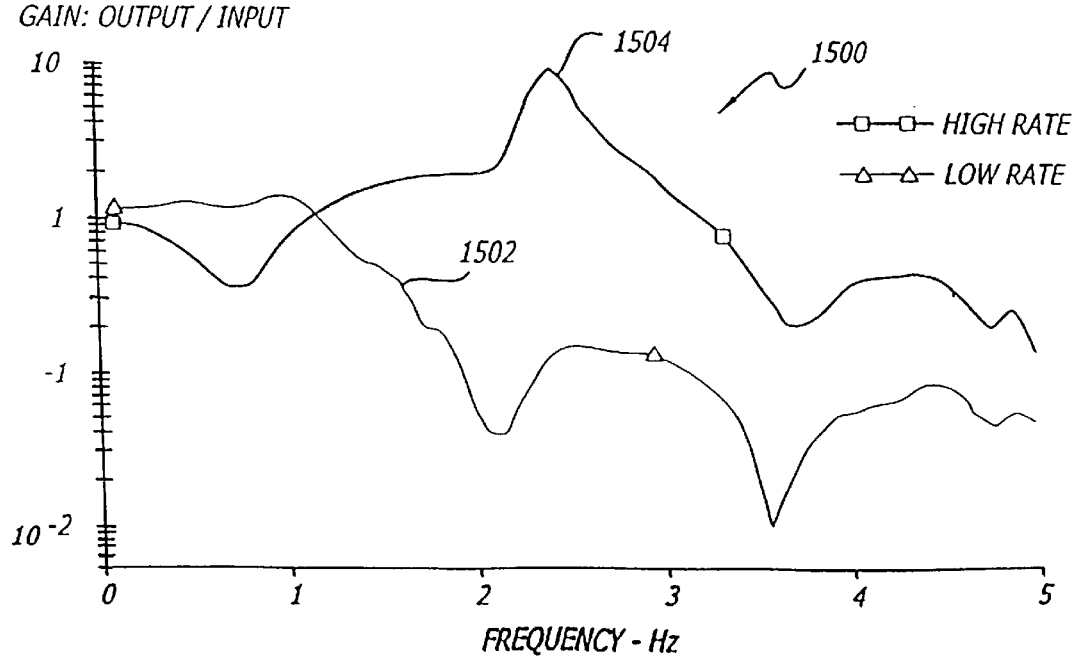

FIGS. 13, 14, and 15 illustrate the general embodiment of the present method of controlling vibration. The liquid spring system 1300 includes a liquid spring 1306 between a vibration source 1302 and a load 1304 to be isolated. The method can readily be applied to any suspension of load or a vibration isolation problem. The liquid spring system described above can provide a very wide range of spring rate (several orders greater than air spring technology), coupled with lower energy consumption and cost than active systems, can benefit a variety of non-vehicle-suspension applications. The vibration source can be generally characterized by the graph 1302(a) which shows a variety of vibration amplitudes as a function of time. The liquid spring can dampen the impact of these vibrations as shown in graph 1304(a). Note, the amplitude of the vibration is greatly diminished. This is accomplished by either 1) mechanical isolation of the load from the vibration source, and/or 2) adaptation of the system spring rate according to the characteristics of the vibration input. The liquid spring can be attached between the vibration source and the isolated load by a variety of connections. Pinned connections 1308, 1310 are shown. Pinned connections allow for a certain amount of horizontal translation between the vibration source and the isolated load.

The use of a liquid spring can be a great benefit in a number of applications. For example, earthquakes destroy many types of structures such as buildings, bridges, elevated highways, and tunnels. In each of these examples, a liquid spring can be placed between a first structural member and a second structural member. An elevated highway, for instance, uses a pad (typically poured concrete) to support a column: A beam then spans between adjacent columns. During an earthquake, vibration creates a dynamic load which overcomes the structural integrity of the column or the beam. A liquid spring can be placed between the pad and the column. Alternatively, the liquid spring can be placed between the column and the beam. If the underlying soil is suitable, a liquid spring could conceivably be placed between ground and the pad. The liquid spring will minimize the transmission of the vibration between the various structural members. A passive system provides a certain level of protection. An active system could actually sense the vibration and determine the best spring rate and damping to reduce any risk of damage. It must be understood that such a system can be used with virtually any type structure. In a building, for example, the liquid spring could be placed between the building foundation and a structural member. Alternatively, the liquid spring could be placed between floors. The liquid spring can be placed at any angle, vertically, or horizontally.

FIG. 14 is illustrative of a typical vibration input/output response characteristics for system with two spring rates. The traces were produced with a math model which describes the suspension of a car going over a bumpy surface. The spring rate for a liquid spring can be controlled by several variables: the cross sectional area of the chamber containing the compressible fluid, the pressure of the compressible fluid, the specific composition of the fluid.

A system can be devised which is switchable between a first and a second spring rate. A two-rate system was subjected to an input represented by tracing 1402. The input provided a vibration of various amplitudes over a range of frequencies. The "low rate" response characteristic 1404 is greatly improved over about 1.2 Hz, while being moderately inferior below that frequency. The "high rate" response characteristic 1406 shows an advantage over the "low rate" at frequency values below 1.5 Hz. The power spectral density (PSD) of the vibration is measured along the y-axis in meters$^2$/Hz. PSD is a measure of the energy in a motion as a function of the frequency. The graph illustrates the principle that a suspension system benefits from having a low rate and a high rate.

FIG. 15 illustrates a two-rate system response gain 1500. Gain is defined as the output/input. Again the "low rate" response characteristic 1502 is greatly improved at frequencies greater than 1.2 Hz. Since the input frequency characteristic cannot always be predicted or limited to a narrow range, the ability to tune the system response dynamically by changing the spring rate allows the system gain to be reduced. For instance, for inputs below 1.2 Hz, the "high rate" setting 1504 can be chosen to reduce the output response, while for higher frequency inputs the "low rate" setting can be employed. The adjustment is made by connecting the second volume with the first volume in response to a sensor's determination of the vibration frequency.

Figure 17:
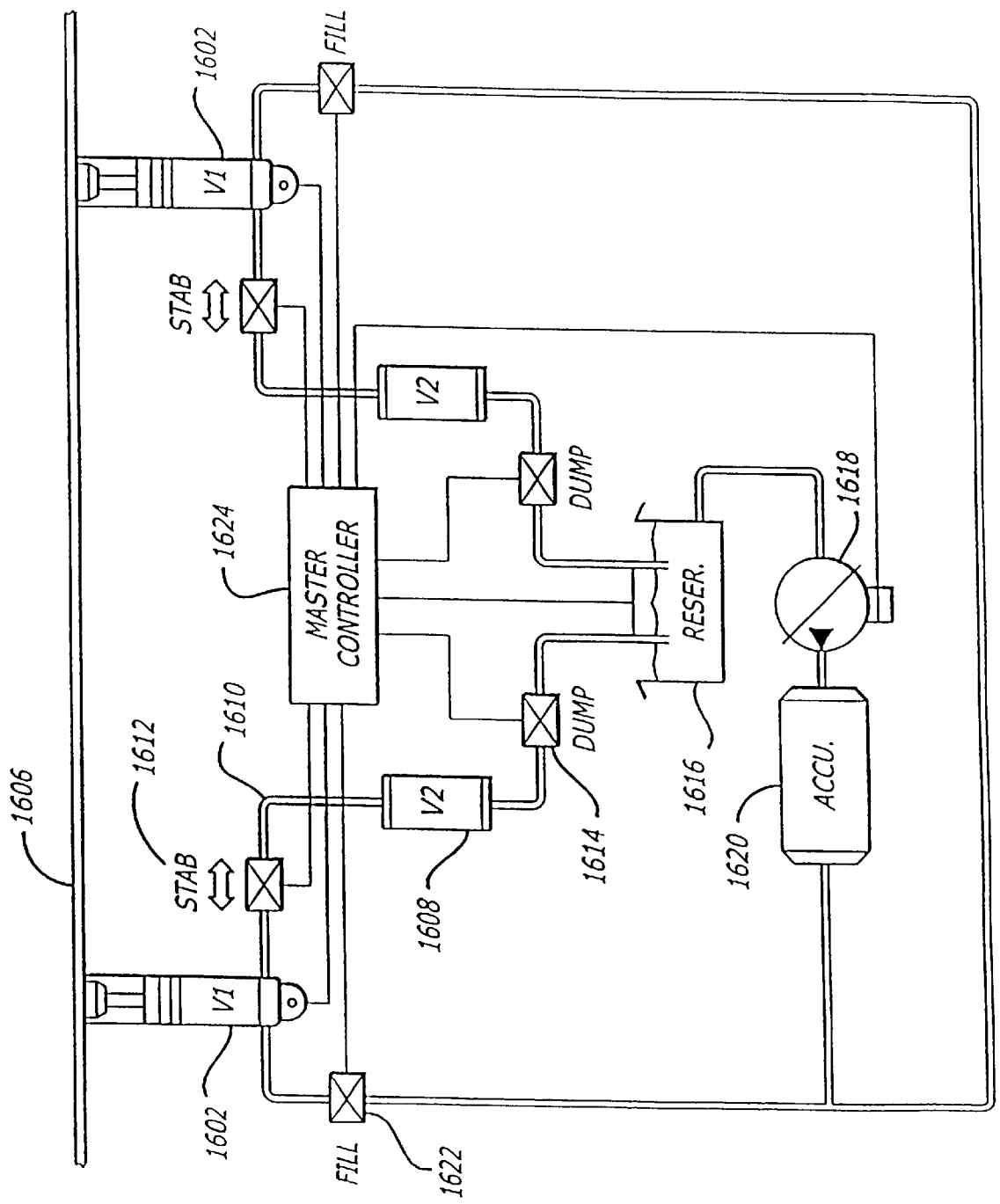

FIGS. 16 and 17 illustrate an active vibration control system applied between a vehicle cabin and a vehicle frame. The system can readily be applied to any suspension of load or a vibration isolation problem. The approach shown is an adaptive two-volume system 1600. This system provides anti-roll control to reduce cab roll during truck cornering. A pair of liquid springs 1602 is coupled between the truck frame 1604 and the vehicle cab 1606. The liquid springs also provide anti-squat control to reduce cab squat during truck acceleration. The liquid springs can be used to produce a soft "highway" ride setting to reduce driver fatigue on the highway. It can also be adjusted to provide a stiff "yard" ride setting to reduce cab whip and jerk in the truck yard. Likewise, the springs can provide anti-bounce control during "frame wracking" to reduce cab bounce during frame twisting under load at low speeds.

FIG. 17 shows the cab mount system 1600 in greater detail. A pair of liquid springs 1602 are mounted between the cab 1606 and the frame (not shown). A supplemental volume 1608 is coupled to each liquid spring by a valved line 1610. A set of valves 1612 are interposed in lines 1610 for anti-roll (stabilizer) function. A second set of valves 1614 are provided between the second volumes 1608 and a reservoir 1616. Valves allow for fluid fill 1622 and fluid dump 1614 functions to the second volumes. The ability to dump compressible liquid provides cab leveling functions and allows for compensation of changes in liquid pressure due to temperature variations.

A hydraulic power supply can comprise a pump 1618, an accumulator 1620, and the fluid reservoir 1616. The hydraulic power supply provides hydraulic power for cab leveling. The flow is controlled by a fill valve 1622. A controller 1624 processes information from sensor inputs, to create output control signals for the various valves and the hydraulic pump. As described above, the liquid springs 1602 can be controlled to change spring rate, damping (not shown here) and leveling control by opening or closing valves in response to inputs as determined by some controller system. If the system is used to control vibration in a building, the building's own power supply could act as the power supply. Any suitable power supply can be used.

Figure 19:
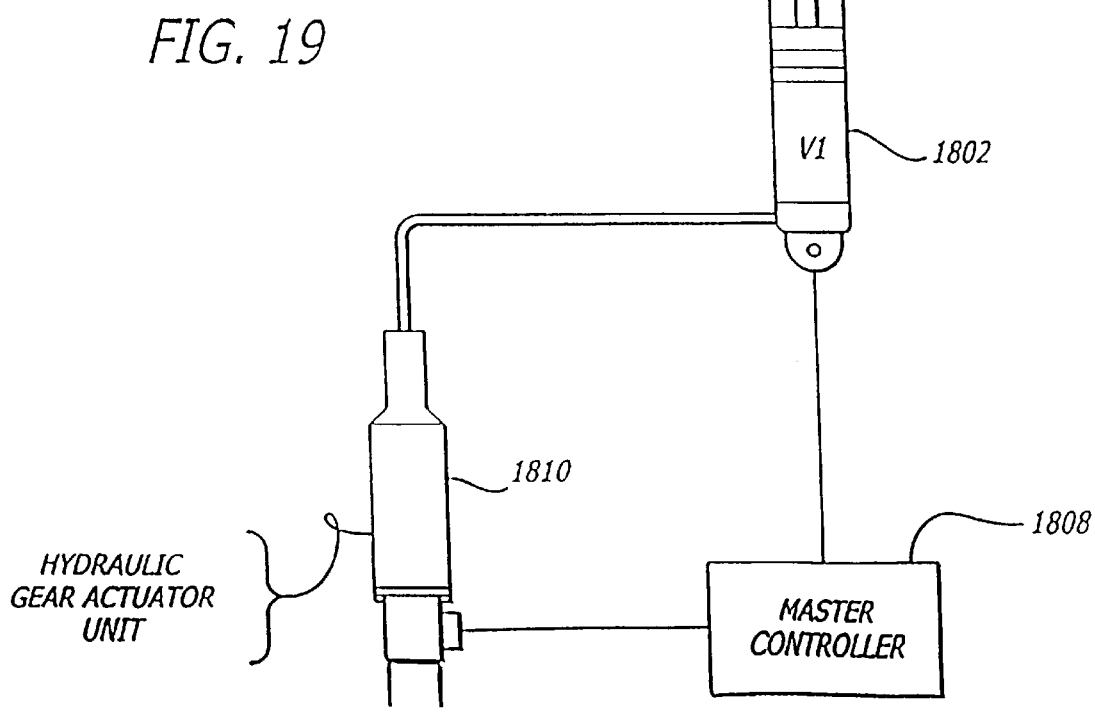

FIGS. 18 and 19 illustrate a passive vibration control system applied between a vehicle cabin and a vehicle frame. This minimalized system provides the improved damping and vibration isolation of the basic liquid spring with the temperature compensation and leveling features. The principal component of the system is the liquid spring strut 1802. The strut 1802 can be located at the center of the rear of the cab 1806. A hydraulic linear gear actuator unit 1810 provides cab leveling and temperature compensation. A controller 1808 processes information from sensor input and creates an output control signal for the hydraulic linear actuator unit. This approach incorporates a hydraulic linear actuator unit to accomplish the functions of the hydraulic power supply, fill and dump valves of the first configurations.

Figure 21:
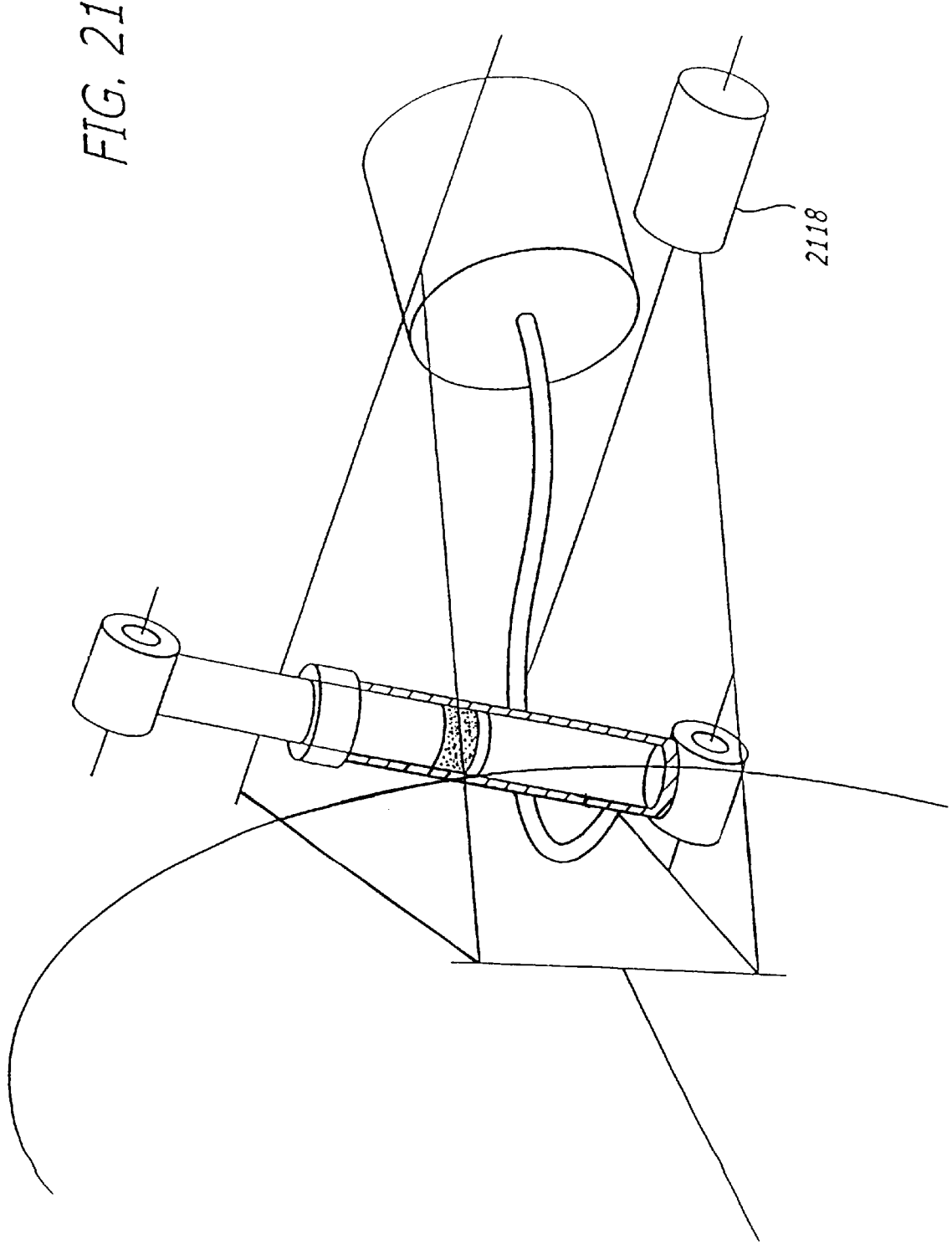

FIGS. 20 and 21 illustrate a pistonless liquid spring for use in vibration control. The pistonless liquid spring has an outer housing 2002, which is generally cylindrical. A first volume of compressible fluid 2004 is captured in this housing by a ram 2008. A supplemental volume 2006 is connected to the first volume by line 2007. A seal 2014 around the bottom of the ram prevents migration of the fluid around the ram. Likewise, a seal 2010 is placed around the top of the housing 2002. The ram can be attached to either the vibration source or the isolated load by connection means 2012. The housing can be attached to the other of the vibration source or the isolated load by connection means 2016.

The strut 2000 functions in every way like the liquid spring described above, with the exception that there is no damping element. Accordingly, damping must be obtained from a separate, conventional, or adaptive shock absorber 2018. Alternatively, FIG. 21 illustrates a similar pistonless liquid spring; however, it is coupled to a torsional damper 2118. Again, the passive system acts as a spring but not as a damper.

It is possible to use a variety of control schemes to control the various vibration control systems described above. As one example, pulse width modulation in a control signal from a controller may be used to vary the characteristics of a suspension system to respond to changing conditions. A controller using pulse width modulation may be used for vibration control and to control the suspension on one or more wheels of many different types of vehicles, including two, three, and four wheeled vehicles. For example, a controller using pulse width modulation may be used to control vibration in buildings, bridges, elevated highways, and tunnels.

A use of a liquid spring system in a four wheeled vehicle will now be described as an exemplary embodiment of the invention. In such an embodiment, pulse width modulation (PWM) of a single solenoid actuated valve at each wheel is used to control both stiffness and damping at each wheel. However, it should be understood that different control schemes may be used in accordance with the invention, as may a variety of types and numbers of valves per wheel. Moreover, stiffness alone may be controlled, or stiffness controlled with one or more valves and damping independently controlled with one or more additional valves.

Figure 22:
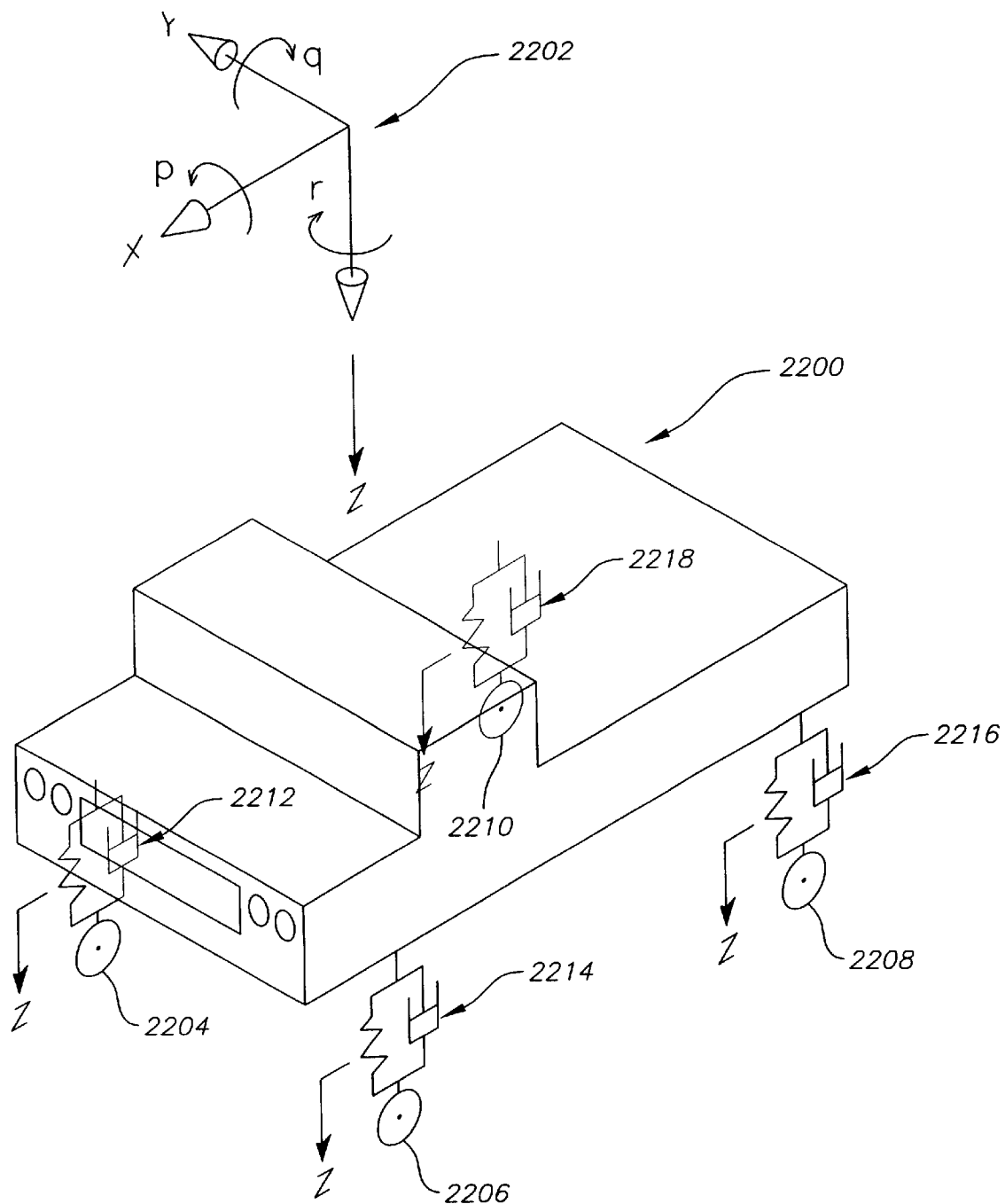
FIG. 22 is a schematic diagram indicating the types of motion that a vehicle can experience.

FIG. 22 illustrates a vehicle body 2200 and the types of forces that the vehicle body encounters along a three dimensional coordinate system 2202. The vehicle may experience modes of motion including roll, pitch, warp and heave as generally indicated in FIG. 22. Roll is a rotation around an X axis as shown by the letter p. Pitch is a rotation around a Y axis as shown by the letter q. Warp is proportional to a rotation around a Z axis as shown by the letter r. Heave is motion along the Z axis.

The vehicle body 2200 is suspended above a right front wheel 2204, a left front wheel 2206, a left rear wheel 2208 and a right rear wheel 2210 by a right front liquid spring/damper assembly 2212, a left front liquid spring/damper assembly 2214 a left rear liquid spring/damper assembly 2216 and a right rear liquid spring/damper assembly 2218 respectively, which act to prevent undesired motion or vibration along or about the indicated axes. The connection between each spring/damper 2212, 2214, 2216, and 2218 to each wheel 2204, 2206, 2208 and 2210 is represented schematically. In practice, each liquid spring is coupled between the frame of the vehicle and the respective wheel support structure.

Figure 23:
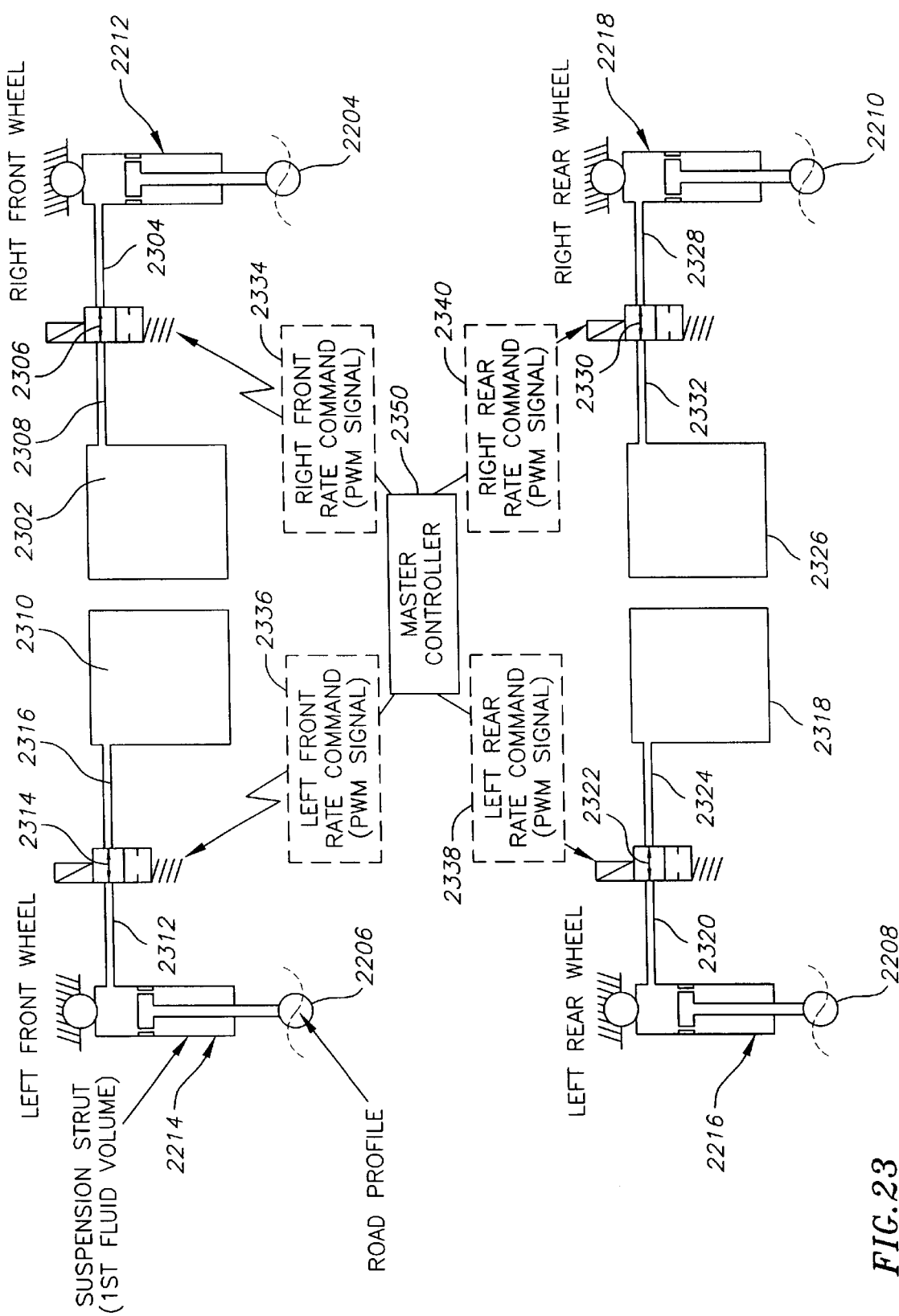
FIG. 23 is a schematic diagram of a suspension and control system for a four wheeled vehicle according to an embodiment of the present invention.

FIG. 23, is a schematic diagram of an active liquid spring vehicular suspension system according to an embodiment of the present invention. As shown in FIG. 23, the right front spring/damper 2212 is coupled in fluid communication with a secondary volume 2302 via a first line 2304, a solenoid stabilizer valve 2306, and a second line 2308. The left front spring/damper 2214 is coupled in fluid communication with a secondary volume 2310 via a first line 2312, a solenoid stabilizer valve 2314, and a second line 2316. The left rear spring/damper 2216 is coupled in fluid communication with a secondary volume 2318 via a first line 2320, a solenoid stabilizer valve 2322, and a second line 2324. The right rear spring/damper 2218 is coupled in fluid communication with a secondary volume 2326 via a first line 2328, a solenoid stabilizer valve 2330, and a second line 2332.

In an embodiment, solenoid stabilizer valves 2306, 2314, 2322 and 2330 are poppet valves that are actuated by electrical signals 2334, 2336, 2338 and 2340 respectively. The electrical signals 2334, 2336, 2338, and 2340 issue from a master controller 2350. The master controller 2350 is preferably a digital microprocessor, but may also be an analog control system. A memory 2352 is electrically coupled to the master controller (See FIG. 24). Although this exemplary embodiment of the present invention contemplates the use of a single master controller to control all of the valves, it will be apparent to those skilled in the art that other configurations will perform equally well. For example, each of the solenoid stabilizer valves 2306, 2314, 2322 and 2330 may be controlled by a separate microprocessor or analog controller.

The master controller 2350 receives input signals from one or more sensors, such as those described in conjunction with any of the embodiments of the liquid springs or suspension systems discussed hereinabove, or those sensors discussed in conjunction with FIG. 24 described hereinbelow.

Figure 24:
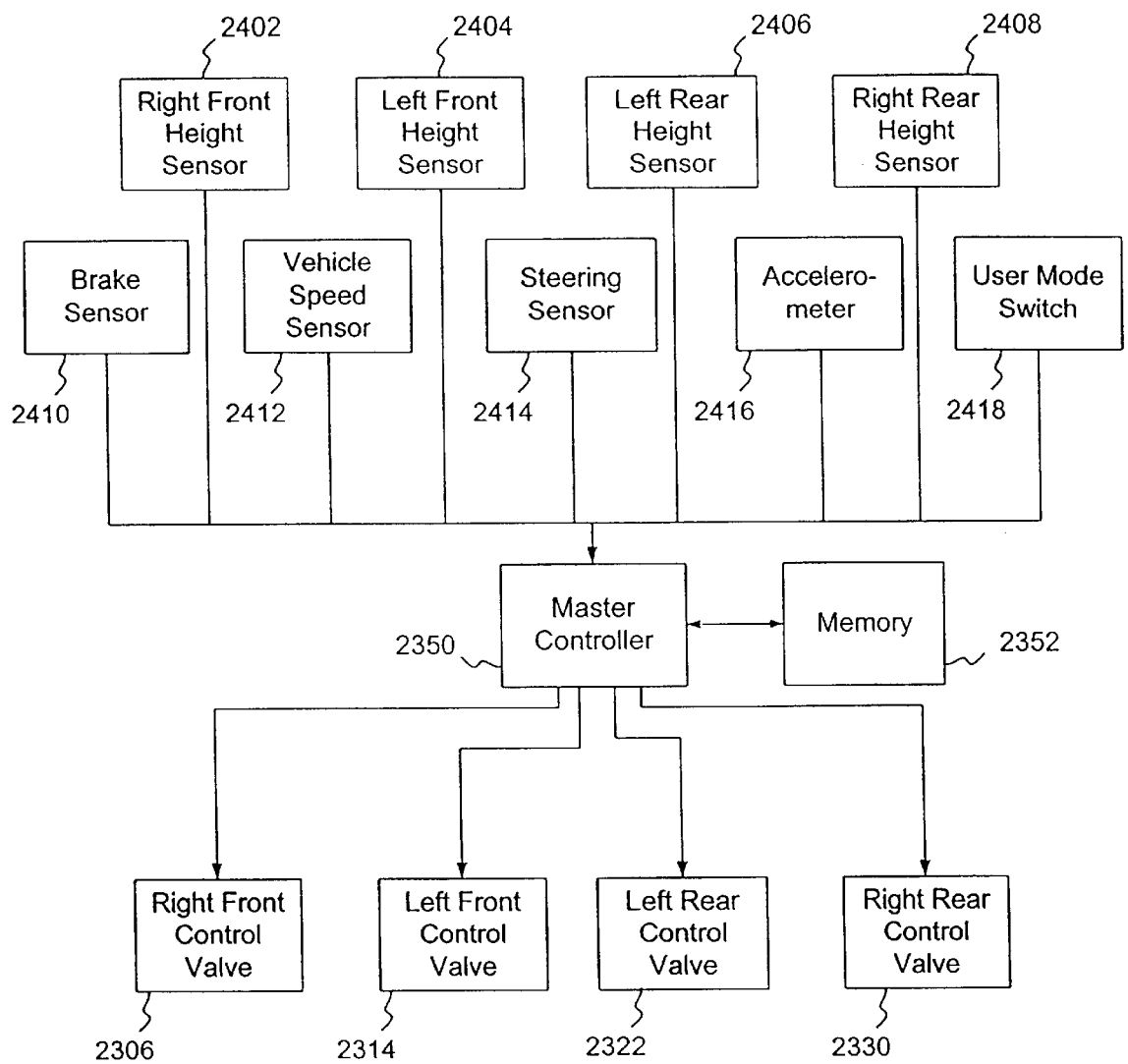
FIG. 24 is a schematic diagram showing the inputs and outputs of an active suspension controller according to an embodiment of the present invention.

As shown in FIG. 24, the master controller 2350 is in one embodiment coupled to several sensor inputs and several control outputs. In this exemplary embodiment, the master controller is electrically coupled to four height sensors 2402, 2404, 2406, and 2408. The four height sensors generate an electrical signal representative of the relative displacement between the vehicle frame and each wheel support assembly, which corresponds to the relative displacement of rod structure 246 into chamber 236 as described with regard to FIG. 1 above. In an embodiment, the height sensors 2402, 2404, 2406, and 2408 operate in analogous manner to the position sensor described above with regard to FIG. 1.

The master controller 2350 is electrically coupled to a brake pressure sensor 2410, which generates an electrical signal indicating that the vehicle braking system has been activated. The master controller 2350 is electrically coupled to a vehicle speed sensor 2412, which generates an electrical signal indicating the speed of the vehicle. Additionally, the master controller 2350 is electrically coupled to a steering wheel position sensor 2414, which generates an electrical signal indicative of a turning motion of the vehicle. The master controller is also electrically coupled to an accelerometer 2416, or "g" sensor, which senses forces lateral to the direction of motion of the vehicle. The accelerometer 2416 generates an electrical signal indicative of changes in velocity of the vehicle in the plane formed by the X and Y axes as shown in FIG. 22.

In an embodiment, the master controller is electrically coupled to a user mode selection switch 2418. A user is able to alter the characteristics of the suspension system by selecting different user modes through the user mode selection switch 2418. In additional embodiments, additional sensors are electrically coupled to the master controller 2350 including a battery sensor for monitoring the amount of charge in a vehicle battery, and an ignition sensor for sensing whether the motor of the vehicle has been turned on. It will be appreciated that other vehicle and environmental factors may be monitored by sensors electrically coupled to the master controller to optimize the suspension settings.

As illustrated in FIG. 24, the master controller is electrically coupled to the right front valve 2306, the left front valve 2314, the left rear valve 2322 and the right rear valve 2330. As will be appreciated, the master controller 2350 may be coupled to additional switches and indicators.

Figure 25:
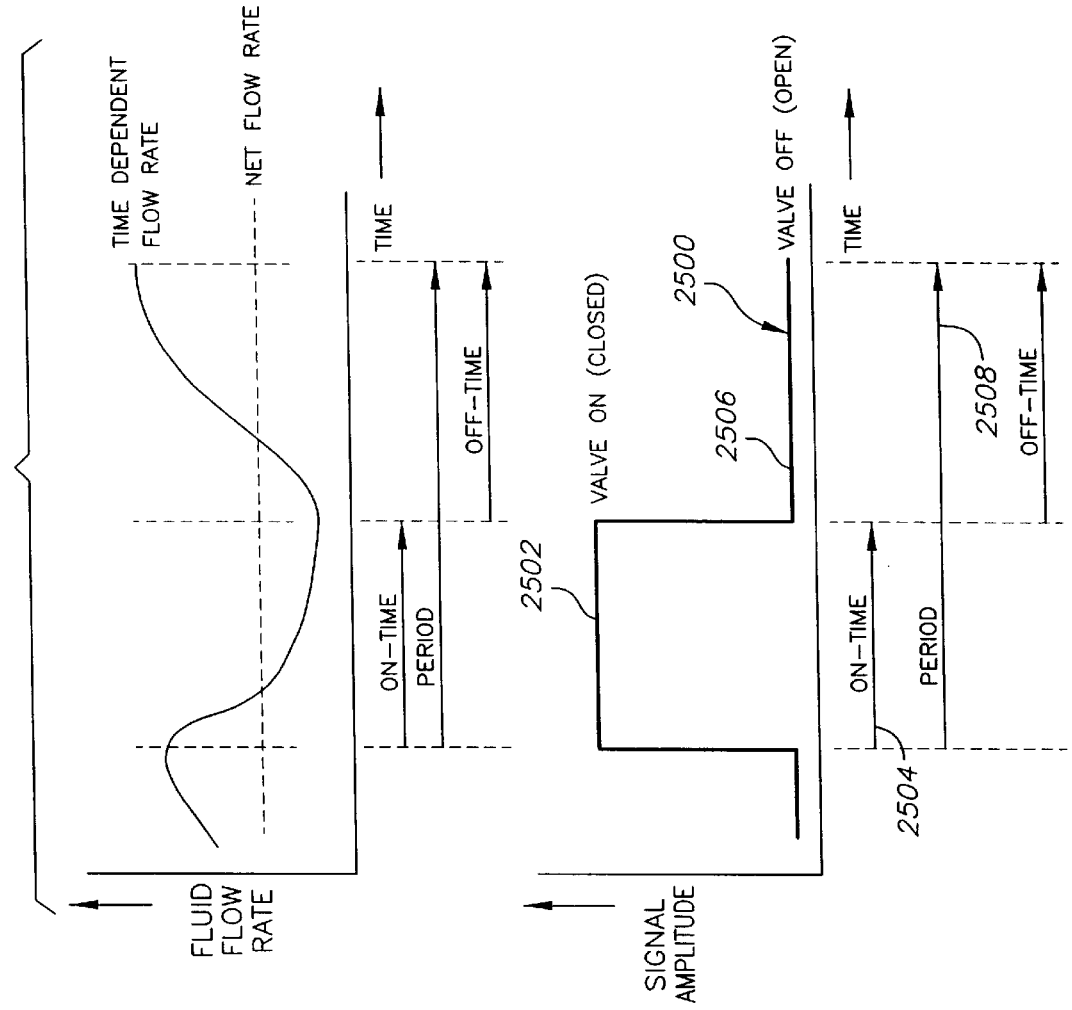
FIG. 25 is a graph showing the effect of pulse width modulation on fluid flow rate.

As shown in FIG. 23 a control signal 2334, 2336, 2338, and 2340 is used to actuate one of the solenoid valves 2306, 2314, 2322 or 2330. The control signals 2334, 2336, 2338, and 2340 comprise electrical signals with a maximum amplitude sufficient to actuate one of the solenoid valves 2306, 2314, 2322 or 2330. FIG. 25 illustrates the relationship between actuation of one of the solenoid controlled valves 2306, 2314, 2322 or 2330 via pulse width modulation ("PWM") and the corresponding pressure changes within one of the liquid springs 2212, 2214, 2216 or 2218 as the valve is closed and subsequently reopened.

By way of example, the following discussion utilizes a solenoid valve and a control signal in the abstract, however it will be apparent to those skilled in the art that a similar control signal 2334, 2336, 2338, and 2340 will produce similar results when applied to valves 2306, 2314, 2322 or 2330.

As shown in FIG. 25, a valve transitions between the fully open state and fully closed state in response to an electrical control signal 2500. The control signal of FIG. 25 is in a first state 2502 for a first interval 2504. The control signal transitions from the first state 2502 to a second state 2506 and remains at the second state 2506 for a second interval 2508.

The time required for the valve to move through its transition state is typically much greater than the time required for the electrical control signal 2500 to transition from an initial state 2502 to the second state 2506 sufficient to deactivate the valve, or from the second state 2506 back to the first state 2502. As shown in FIG. 25, the first and second intervals 2504 and 2508 of the electrical control signal 2500 with durations less than or approximately equal to the transition time of the valve cause the fluid flow rate through the valve to change as the valve partially transitions between its open and closed states.

Typically, valves having short transition times, such as transition times between about 10 and about 50 milliseconds, are used, because the faster the transition time, the more precisely the flow rate may be varied. Typically, poppet or spool on-off (bang-type) valves are used. Such valves are made by Wandfluh, Sterling, and Parker. In alternative embodiments, poppet or spool proportional valves may be used along with a proportional signal to regulate the flow of compressible liquid. Suitable proportional valves are also made by Wandfluh, Sterling, and Parker.

In the embodiment shown in FIG. 25, if the periods of valve opening and closing are too short, then the valve will not reach a steady state in either a fully open or a fully closed position. Thus, the fluid flow rate through the valve will reach neither its minimum nor its maximum possible rate. When averaged over time, the fluctuating fluid flow rate approximates a net flow rate that falls between the minimum and maximum attainable flow rates as shown generally in the upper graph of FIG. 25, thus seamlessly generating a set level of stiffness and damping. As explained below, damping is accomplished by short time interval changes in the valve state to alter the flow rate.

In the embodiment shown in FIG. 25, the valve is open when no current is passing through it and closed when current is passing through it. Therefore, when the solenoid is actuated, during on-time, the valve is closed. The stiffness may be controllably altered to approximate any fluid flow rate between the minimum and the maximum by dividing time into periods and then by determining how much of each period the valve is to be open. The length of the period and the portion of the period that the valve is open is determined by the master controller 2350 based upon predetermined desired vehicle characteristics and based upon detected conditions.

FIG. 25a shows the effect of valve transitions in a proportional valve on the fluid flow rate. The control signal 2550 of FIG. 25a is in a first state 2552 for a first interval 2554. The control signal 2550 transitions from the first state 2552 to a second state 2556 and remains at the second state 2556 for a second interval 2558. The control signal 2550 transition from the second state 2556 to a third state 2560 for a third interval 2562.

Thus, the fluid flow rate through the valve is controllable at several different rates. Averaging the different positions of the valve over time, and the different flow rates under each position, the fluctuating fluid flow rate approximates a net flow rate that falls between the minimum and maximum attainable flow rates, thus generating a set level of stiffness and damping.

Therefore, pulse width modulation may be used to control the action of the on-off type valve, which causes the volume, pressure or rate of flow in the liquid spring to change. Although the valve state is either on or off under the control of the control signal 2500, the actual state of the fluid inside the valve may not correspond to the on or off state, because of the inertia of the fluid or the valve poppet. Furthermore, the net fluid characteristic over a longer period of time can be modulated to some intermediate characteristic, although at a precise point in time the state of the valve is said to be on or off.

In an alternative embodiment shown in FIG. 25a, a proportional valve is used. In this embodiment, the flow rate is varied by varying a proportional control signal to the valve. The valve interprets the control signal so as to vary the fluid flow in a proportional way. In the embodiment shown in FIG. 25a, the valve is open to a first position when the current is in a first state 2552, open to a second position when the current is in a second state 2556, and open to a third position when the current is in a third state 2560. As with the on-off valves, there are still inertia effects in the fluid and the valve, so that the state of the fluid inside of the valve may not correspond to the on or off state or some proportional rate associated with the control signal.

In an embodiment, the stiffness may be controllably altered to approximate any pressure, volume, or net fluid flow rate between a minimum and a maximum by altering the proportional signal to open the valve to a position closest to the desired pressure, volume, or net fluid flow rate. The alterations to the proportional signal are determined by the master controller 2350 based upon predetermined desired vehicle characteristics and based upon detected conditions. The net fluid characteristic over a longer period of time may be modulated to some proportional characteristic more directly than would be the case with an on-off type valve.

Figure 26:
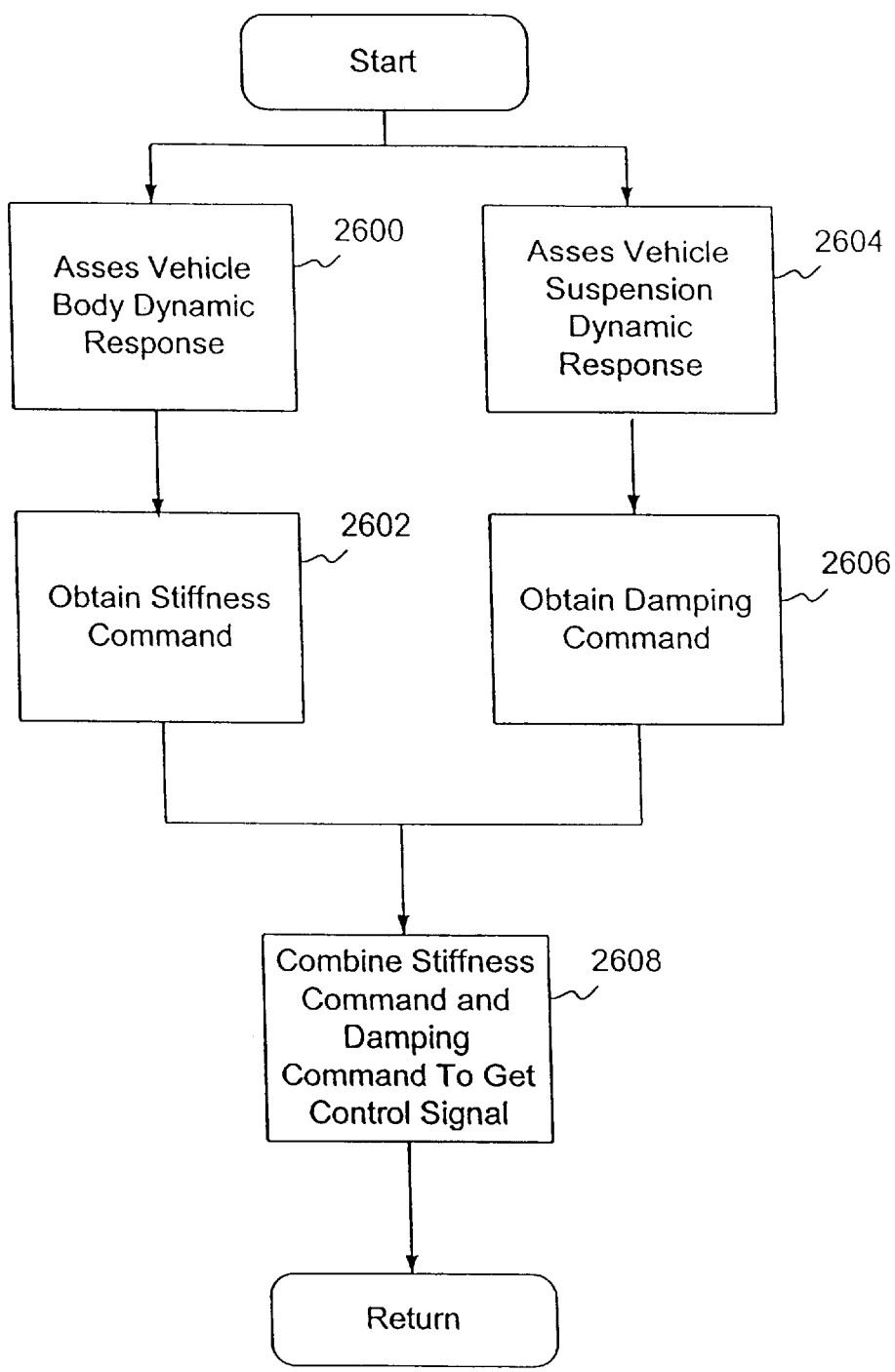
FIG. 26 is a flow chart showing the procedure by which the rate command sent to a valve is calculated according to an embodiment of the present invention.

FIG. 26 shows an overview of how the control signals to the valves are determined. Initially, the master controller 2350 assesses vehicle body dynamic response from all available sensors (Box 2600). The vehicle body dynamic response is the effect of the environment on the vehicle as a whole. Using the information from the sensors, the master controller 2350 calculates a stiffness command (Box 2602). The master controller 2350 assesses vehicle suspension dynamic response from the wheel height sensors 2402, 2404, 2406 and 2408 (Box 2604). The vehicle suspension dynamic response is the effect of the environment on a given wheel. Using the information from the wheel height sensors, the master controller 2350 calculates a damping command (Box 2606). The master controller uses the stiffness command and the damping command to form a control command (Box 2608).

Figure 27:
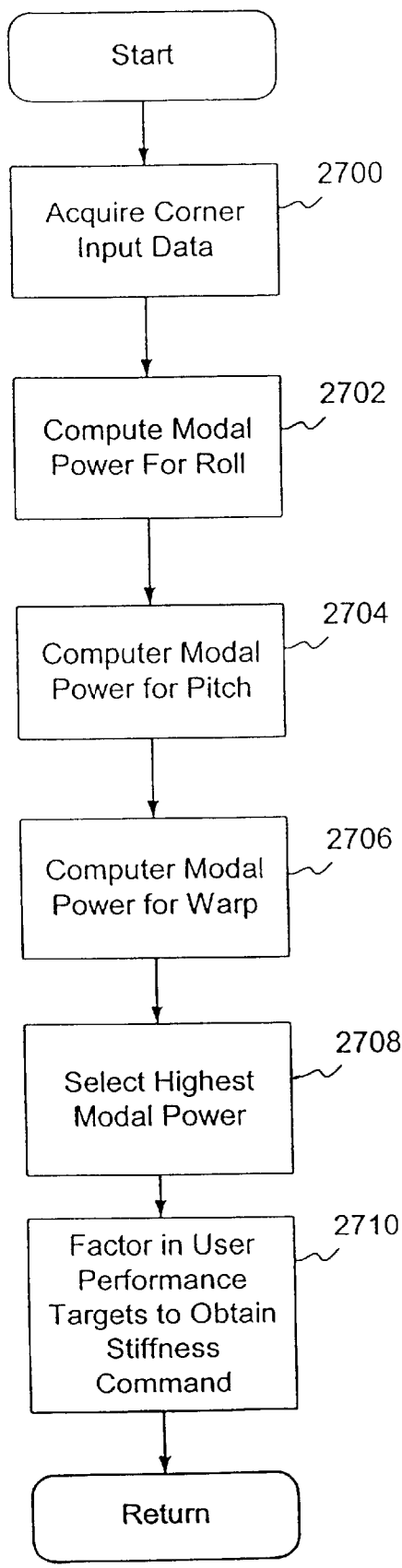
FIG. 27 is a flow chart detailing the calculation of the stiffness command according to an embodiment of the present invention.

FIG. 27 shows the process for determining the control signal corresponding to stiffness in more detail according to an embodiment of the present invention. The master controller 2350 polls the sensors and communicates with the valves multiple times per second. The master controller 2350 receives input data from at least one of the four height sensors 2402, 2404, 2406, and 2408, the brake pressure sensor 2410, the vehicle speed sensor 2412, the steering sensor 2414, the accelerometer 2416, and the user mode switch 2418 (Box 2700). The master controller 2350 uses the information obtained from the sensors to compute the modal power of the roll (Box 2702), the pitch (Box 2704), and the warp (Box 2706). The modal power is one way of measuring energy imparted on a vehicle. As will be seen by those skilled in the art, other ways of measuring the energy imparted on a vehicle could be used, such as measuring displacements, velocity and acceleration.

In an embodiment, the information obtained from some of the sensors is displacement information that is modified mathematically in view of known quantities of the vehicle such as mass and time intervals to compute velocity, acceleration and power. In another embodiment, information is gathered from a sensor by comparing the sensed value at two or more different times to compute changes in the sensed value over a time interval.

Once the master controller 2350 has computed the modal power of each of the roll, the pitch and the warp, the master controller 2350 in one embodiment selects the highest modal power to set the stiffness command (Box 2708). For example, if the vehicle has just hit a large bump in the road, the modal power of the pitch may be the highest and the modal power of the pitch may be used to generate the stiffness command. In alternative embodiments, modal powers in addition to the highest modal power or a modal power other than the highest modal power may be selected to set the stiffness command. In yet another embodiment, a plurality of modal powers are considered in setting the stiffness command. In an exemplary embodiment, the generated stiffness command is calculated for each specific wheel.

In an embodiment of the present invention, the period for setting stiffness is one second, because the vehicle as a whole tends to oscillate through a period of one second. The stiffness is set by closing and opening each valve for a portion of the one second period using pulse width modulation.

The master controller uses a chosen modal power in conjunction with user supplied targets of performance to obtain the stiffness command (Box 2710). In an embodiment, a table is stored in the memory 2352 with numerical values based upon the available performance modes. The user performance targets may be preselected either by the manufacturer or by a user with the user mode switch 2418. In an exemplary embodiment, the user may select from a sport mode that has relatively high stiffness, a normal mode that is less stiff than the sport mode, and a comfort mode that has relatively low stiffness in comparison with the normal and sport modes.

In an exemplary embodiment, the master controller is programmed with a model of the vehicle that runs in real time. At every clock cycle of the master controller, the model defines the estimated position and forces acting on the vehicle. The model indicates the stiffness required to achieve the performance targets. Therefore, based on the modal power sensed, the controller predicts the stiffness necessary to maintain the selected performance targets, and adjusts the pulse width to generate the necessary stiffness.

In an embodiment, a selected modal power is used in conjunction with the speed of the vehicle, as sensed by the speed sensor, to compute any changes in the pulse width. This is because a performance mode may have different stiffness requirements at different speeds. An offset table is created for determining whether the modal power is significant enough to warrant adjustment. The offset table may be set with specific power amounts corresponding to specific speeds and specific performance modes. In order to simplify the number of different offsets and speeds in the offset table, interpolation may be used to generate an offset based upon the two closest speeds in the offset table to the actual measured speed.

If the power calculated from sensor input is above the offset power listed in the offset table (or interpolated) for the speed of the vehicle, then the pulse width is modified to adjust for the calculated modal power. In order to determine how much to modify the pulse width, a gain table is created. The gain table may be set with specific gain amounts at specific speeds for specific performance modes. In order to simplify the number of different gains and speeds in the gain table, interpolation may be used to generate a gain based upon the two closest speeds in the gain table to the actual measured speed. The power amount in the offset table (or the interpolated power amount) is subtracted from the selected modal power to calculate a net power. The net power is multiplied by the gain selected (or interpolated) from the gain table to calculate a modification power. The modification power is submitted to a pulse width calculation function that correlates a specific modification power to a specific change in pulse width modulation. In an embodiment, a table with pulse width modulation changes for specific modification powers is used along with interpolation to calculate the changes in the pulse width.

In an exemplary embodiment, the master controller functions as a feedback loop and checks to see the effect of the generated stiffness command during the next clock cycle. Depending on the effect of the generated stiffness command, the master controller may alter the stiffness command for more or less effect.

In additional embodiments of the present invention, the stiffness command may be calculated based upon other sensed parameters. In an embodiment, information from the brake sensor 2410 is used to calculate a stiffness command. As explained above, it is sometimes desirable to increase stiffness during braking to prevent the front of the vehicle from dipping.

Figure 28:
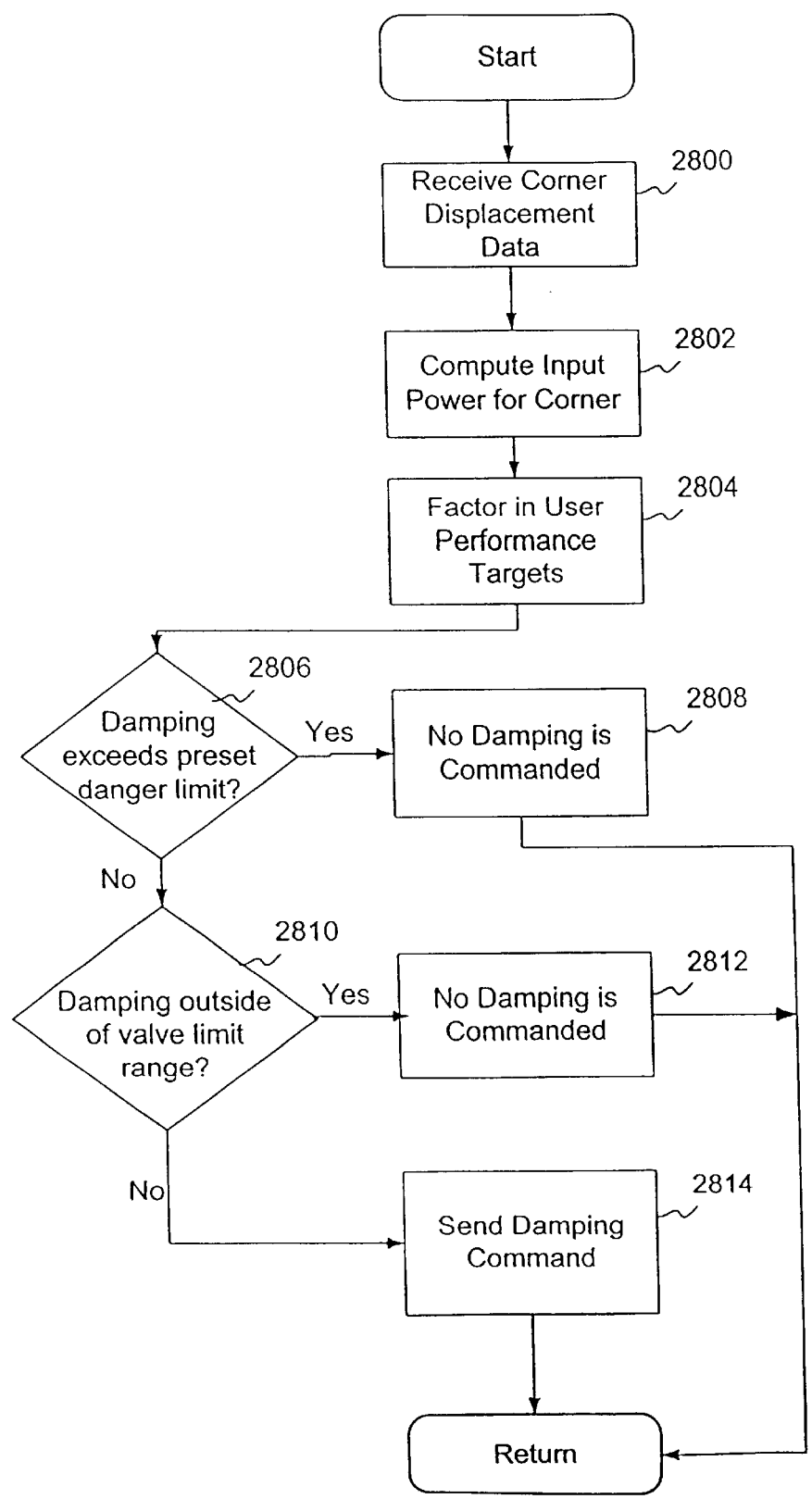
FIG. 28 is a flow chart detailing the calculation of the damping command according to an embodiment of the present invention.

FIG. 28 shows the process for determining the control signal corresponding to damping in more detail according to an embodiment of the present invention. Damping is accomplished by opening and closing the control valve for a fraction of a shorter period of time than the period used by the master controller 2350 for controlling stiffness. The master controller 2350 polls the sensors and communicates with the valves multiple times per second. The master controller 2350 receives input data from at least one of the four height sensors 2402, 2404, 2406, and 2408 (Box 2800). In an embodiment, the sensor conveys information about the amount that the particular wheel has moved up or down relative to the frame of the automobile since the sensor was last queried. Depending on the amount each wheel moves over a given time interval, an input power is computed for each wheel (Box 2802). In an alternative embodiment, the sensor senses an upward or downward force. The sensed force is converted mathematically in view of other known values such as mass and time to acquire acceleration, velocity and power.

Once the input power for a wheel is calculated, the input power is modified by a factor depending on user performance targets (Box 2804). In an embodiment, the modification may be done in a manner analogous to the technique explained above for stiffness. Once the input power has been modified based on user performance targets, the resulting power for each wheel is compared to a preset power maximum (Box 2806). Damping influences a control signal in a direction opposite to stiffness. Therefore, a preset power maximum is predetermined so that damping is not so extreme as to endanger a vehicle operator by drastically reducing stiffness during high acceleration or during sharp cornering, which could lead to instability. In an embodiment, the power maximum is stored in a table in the memory 2352 depending upon at least one of the speed sensed by the speed sensor 2412, the acceleration sensed by the accelerometer 2416, and the steering wheel position sensed by the steering wheel position sensor 2414. The table is stored in the memory 2352 electrically coupled to the master controller 2350.

If the resulting power for a wheel exceeds the preset power maximum, then no damping is commanded (Box 2808). It the power is equal to, or lower than, the power maximum, then the power input is compared to a preset valve limit range (Box 2810). The preset valve limit range is dependent upon the time period necessary for a valve to transition from one state to another. If the period of the damping command is outside of the valve limit range, then the valve will not have time to effectuate damping. If the power input is outside of the preset valve limit range, then no damping is commanded (Box 2812). If the power is equal to, or lower than, the preset valve limit maximum, then the power input is used to set a damping command (Box 2814). In an embodiment of the present invention, the period for setting damping is one tenth of one second, and the damping is set by closing and opening each valve for a portion of the one tenth of one second period.

In order to create the rate command, according to an embodiment of the present invention, the master controller conducts a NAND logic function on the damping command and the stiffness command. The resulting rate command is shown in FIGS. 29 and 30. As shown in FIG. 29, when the stiffness command is equal to zero, meaning that no stiffness command is sent, the valve would normally remain open as shown in a first time interval 2900. However, if a damping command is sent, the damping command is sent directly without using the logical NAND function. This application leads to a command signal that turns on the valve in question, closing the valve, as seen in a second time interval 2902. The second time interval 2902 corresponds to the shorter periods used in the damping commands. Following the period of the damping command, the command signal returns to zero as seen in a third time interval 2904. This changing of the valve changes the flow rate and creates damping.

FIG. 30 is a graph showing the command signal generated when there is a stiffness command present that closes the valve for a portion of a time interval to enhance stiffness, and there is a damping command. The stiffness command causes a command signal that turns on a solenoid, closing it, as seen in the change from a first time interval 3000 where the valve is off to a second time interval 3002 where the valve is on. At some point during the pre-established stiffness time interval, a damping command causes the command signal to return to zero and turn off the valve, even though in the absence of the damping command, the valve would have remained on as seen in a third time interval 3004.

Figure 31:
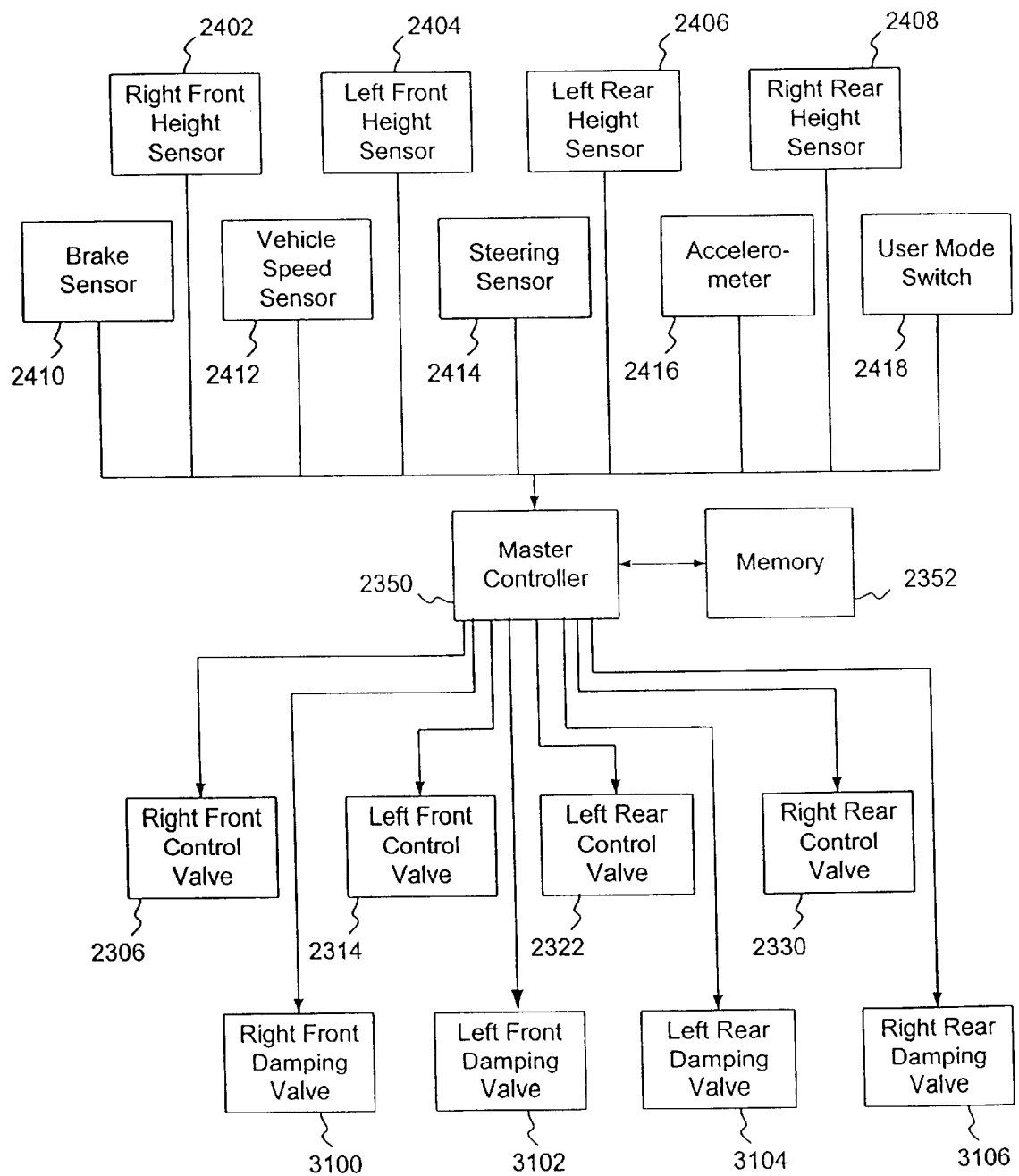
FIG. 31 is a schematic diagram showing the inputs and outputs of an active suspension controller according to an alternative embodiment of the present invention.

In an alternative embodiment of the present invention, illustrated in FIG. 31, the stiffness command and the damping command do not compete with each other to modify the pulse width modulation of a single control valve. Rather, each of the stiffness command and the damping command control separate valves. Namely, the stiffness command controls a stiffness valve, and the damping command controls a damping valve. In an embodiment of the present invention, the control valves 2306, 2314, 2322, and 2330 function as stiffness valves.

In an exemplary embodiment, each damping valve is analogous to solenoid flow valve 272 described above with regard to FIG. 1. Solenoid flow valve 272 allows fluid to pass between two chambers 236b and 236a of the liquid spring through a passage 274 to create damping. The master controller controls a right front damping valve 3100, a left front damping valve 3102, a left rear damping valve 3104, and a right rear damping valve 3106. The damping valves are controlled based on the damping command described above.

Figure 23A:
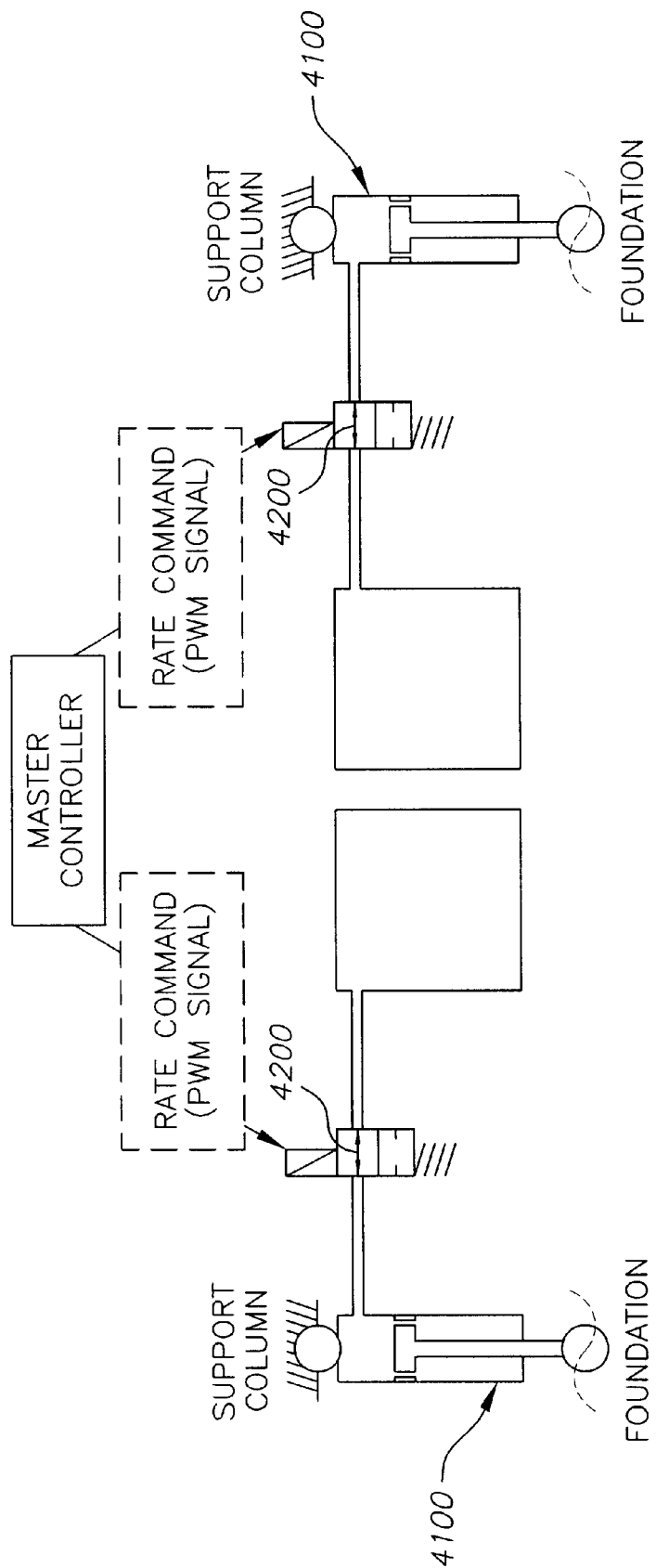

A vibration control system, such as the one described above may be used to mitigate earthquake damage in buildings, bridges, elevated highways, and tunnels through strengthening and/or isolation. As shown in FIG. 23a, liquid springs 4100 may be positioned between foundational members and one or more support columns of the remainder of the structure to be protected. The vibration control system in these structures would utilize sensors to detect earth movement such as those described in conjunction with any of the embodiments of the liquid springs or suspension systems discussed above. The signals from the sensors would be used to generate a control signal in a manner analogous to the system described above for vehicles. The control signal would alter one or more valves 4200 to adjust stiffness and/or damping. One benefit to this system as applied to earthquake mitigation, is the ability to change the stiffness at the natural frequency of the structure to prevent severe structural damage.

Although preferred embodiments of the present invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts.

What is claimed is:

1. A vibration control system for a structure having a first structural member and a second structural member, the vibration control system comprising:

a liquid spring having a first volume of compressible liquid in a first chamber operably interposed between the first structural member and the second structural member, the liquid spring using a compressible liquid to generate both spring and damping forces in response to relative displacement between the first structural member and the second structural member;

a second volume of compressible liquid in a second chamber, the second volume remotely connected to the liquid spring by a fluid passage;

at least one valve coupled to the fluid passage, the at least one valve selectively operable to place the second volume in communication with the liquid spring; and a controller electrically coupled to the at least one valve, the controller emitting a control signal to control the at least one valve;

wherein the controller alters the control signal to modulate the at least one valve to adjust at least one of the group consisting of a pressure, a volume, and a rate of flow of compressible liquid in the liquid spring to vary smoothly in between minimum and maximum attainable values to alter at least one of the stiffness and the damping of the liquid spring.

2. The vibration control system of claim 1 wherein the structure is a vehicle; the first structural member is a frame; and the second structural member is a wheel.

3. The vibration control system of claim 2 wherein the control signal comprises a period and a pulse width; and wherein the controller alters the control signal by altering the pulse width to open and close the at least one valve for a portion of the period.

4. The vibration control system of claim 3 further comprising at least one of the group consisting of:

a height sensor electrically coupled to the controller, the height sensor producing a signal indicative of the position of the frame in relation to the wheel;

a speed sensor electrically coupled to the controller, the speed sensor producing a signal indicative of the speed of the vehicle; and a steering wheel position sensor electrically coupled to the controller, the steering wheel position sensor producing a signal indicative of a steering wheel position of the vehicle;

wherein the controller alters the pulse width of the control signal in response to the signal from the at least one of the group consisting of the height sensor, the speed sensor, and the steering wheel position sensor.

5. The vibration control system of claim 4 wherein the controller alters the pulse width of the control signal in response to the height sensor signal, the speed sensor signal, and the steering wheel position signal.

6. The vibration control system of claim 4 further comprising:

an accelerometer electrically coupled to the controller, the accelerometer producing a signal indicative of an acceleration experienced by the vehicle;

wherein the controller alters the pulse width of the control signal in response to at least one of the group consisting of the height sensor signal, the speed sensor signal, the steering wheel position signal, and the accelerometer signal.

7. The vibration control system of claim 4 further comprising:

a brake sensor electrically coupled to the controller, the brake sensor producing a signal indicative of a brake application of the vehicle;

wherein the controller alters the pulse width of the control signal in response to at least one of the group consisting of the height sensor signal, the speed sensor signal, the steering wheel position signal, and the brake sensor signal.

8. The vibration control system of claim 7 wherein the controller alters the pulse width of the control signal in response to the height sensor signal, the speed sensor signal, the steering wheel position signal, and the brake sensor signal.

9. The vibration control system of claim 4 further comprising:

a mode selection switch electrically coupled to the controller, the mode selection switch producing a signal indicative of desired suspension performance;

wherein the controller further alters the pulse width in response to the selection switch signal.

10. The vibration control system of claim 9 wherein the selection switch further comprises multiple settings, each setting having a different stiffness and damping characteristic from the other settings.

11. The vibration control system of claim 9 wherein the controller alters the pulse width in response to the height sensor signal, the speed sensor signal, the steering wheel position signal, and the mode selection switch signal.

12. The vibration control system of claim 11 further comprising at least one additional wheel and an additional liquid spring to generate both spring and damping forces in the vibration control system in response to relative displacement between the frame and the additional wheel; and at least one additional height sensor, the at least one additional height sensor producing a signal indicative of the position of the frame in relation to the at least one additional wheel;

wherein the controller alters the pulse width in response to the height sensor signal, the speed sensor signal, the steering wheel position signal, the mode selection switch signal, and the at least one additional height sensor signal.

13. The vibration control system of claim 11 further comprising three additional wheels;

three additional liquid springs to generate both spring and damping forces in the vibration control system in response to relative displacement between the frame and three additional wheels; and three additional height sensors, the three additional height sensors producing signals indicative of the position of the frame in relation to the three additional wheels;

wherein the controller alters the pulse width in response to the height sensor signal, the speed sensor signal, the steering wheel position signal, the mode selection switch signal, and the three additional height sensor signals.

14. The vibration control system of claim 4 wherein the height sensor is internal within the liquid spring.

15. The vibration control system of claim 3 wherein the control signal has a period of about one second and wherein the pulse width may be modulated to activate the valve for any portion of the period.

16. The vibration control system of claim 2 wherein the control signal comprises a proportional signal; and wherein the controller alters the proportional signal to move the at least one valve from a first position to a second position.

17. The vibration control system of claim 1 wherein the structure is a building; the first structural member is a support column; and the second structural member is a foundation.

18. The vibration control system of claim 1 comprising a first and second valve coupled to the fluid passage, and wherein the control signal is a first signal to the first valve to alter stiffness and a second signal to the second valve to alter damping.

19. A method for controlling a vibration control system for a structure having a first structural member and a second structural member, the vibration control system comprising a liquid spring having a first volume of compressible liquid in a first chamber operably interposed between the first structural member and the second structural member, the liquid spring using a compressible liquid to generate both spring and damping forces in response to relative displacement between the first structural member and the second structural member; a second volume of compressible liquid in a second chamber, the second volume remotely connected to the liquid spring by a fluid passage; at least one valve coupled to the fluid passage, the at least one valve selectively operable to place the second volume in communication with the liquid spring; and a controller electrically coupled to the at least one valve, the method comprising:

the controller emitting a control signal to control the at least one valve;

the controller altering the control signal to modulate the at least one valve to adjust at least one of the group consisting of a pressure, a volume and a rate of flow of compressible liquid in the liquid spring to vary smoothly in between minimum and maximum attainable values to alter at least one of the stiffness and the damping of the liquid spring.

* * * * *